(12) United States Patent
Dütsch

(10) Patent No.: US 6,443,619 B1
(45) Date of Patent: Sep. 3, 2002

(54) GUIDE UNIT

(75) Inventor: German Dütsch, Schweinfurt (DE)

(73) Assignee: Rexroth Star GmbH (DE)

( * ) Notice: Subject to any disclaimer, the term of this patent is extended or adjusted under 35 U.S.C. 154(b) by 0 days.

(21) Appl. No.: 09/467,386

(22) Filed: Dec. 21, 1999

(30) Foreign Application Priority Data

Dec. 23, 1998 (DE) .......................................... 198 60 027
Nov. 12, 1999 (EP) .............................................. 99122569

(51) Int. Cl.⁷ ............................. F16C 29/06; F16C 33/00
(52) U.S. Cl. ............................................ 384/45; 384/15
(58) Field of Search ............................ 384/15, 16, 43, 384/44, 45

(56) References Cited

U.S. PATENT DOCUMENTS

| | | | |
|---|---|---|---|
| 680,345 A | 8/1901 | Morrison | |
| 4,743,124 A | 5/1988 | Blaurock | 384/45 |
| 4,886,375 A | 12/1989 | Tsukada | 384/15 |
| 4,968,155 A * | 11/1990 | Bode | 384/45 |
| 5,156,195 A * | 10/1992 | Wehler et al. | 384/15 X |
| 5,295,748 A * | 3/1994 | Yamazaki | 384/45 |
| 5,399,023 A | 3/1995 | Winkelmann et al. | 384/13 |
| 5,634,722 A * | 6/1997 | Yuasa et al. | 384/15 |
| 5,678,927 A | 10/1997 | Yabe et al. | 384/13 |
| 5,871,283 A | 2/1999 | Isobe et al. | 384/15 |
| 5,911,509 A * | 6/1999 | Kawaguchi et al. | 384/45 |
| 6,082,899 A * | 7/2000 | Suzuki et al. | 384/45 X |
| 6,132,093 A * | 10/2000 | Michioka et al. | 384/45 |

FOREIGN PATENT DOCUMENTS

GB        2010413        6/1979

OTHER PUBLICATIONS

Mannesmann Rexroth Deutsche Star, "STAR Schienenführungstische", Prospectus RD 82 501/06.96, 1 page.
English–language Abstract for JP 11–201163, published Jul. 27, 1999.
English–language Abstract for JP 10–037956, published Feb. 13, 1998.

* cited by examiner

*Primary Examiner*—Charles A Marmor
*Assistant Examiner*—Roger Pang
(74) *Attorney, Agent, or Firm*—Baker Botts LLP

(57) ABSTRACT

For protecting a guide rail (10) between two guide carriages with fixed spacing (A) running on the guide rail (10), a covering means (20) which adjoins each of the guide carriages (12) and has a rigid configuration in the axial direction (X) over a substantial part of its length is provided between the two guide carriages (12).

14 Claims, 18 Drawing Sheets

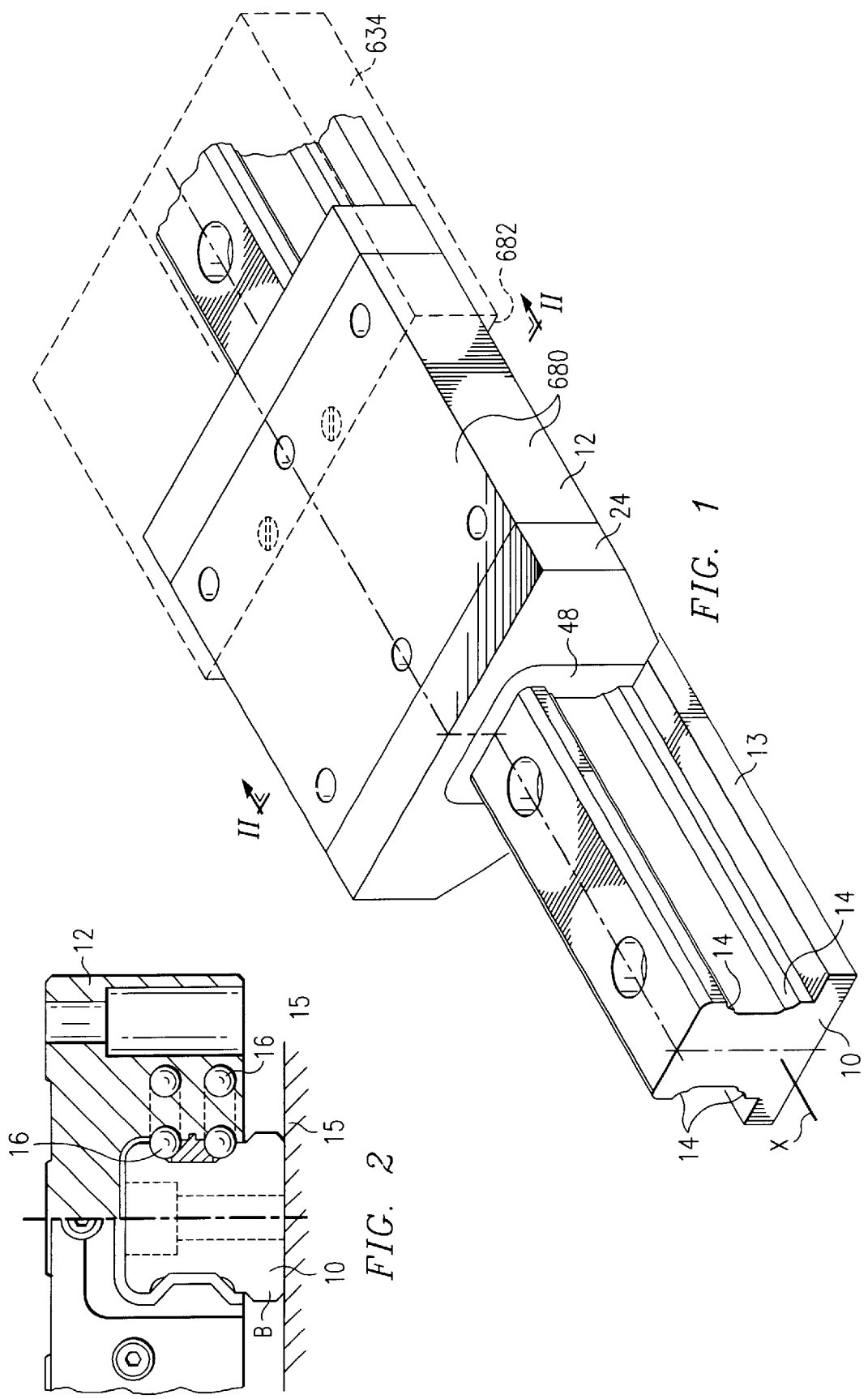

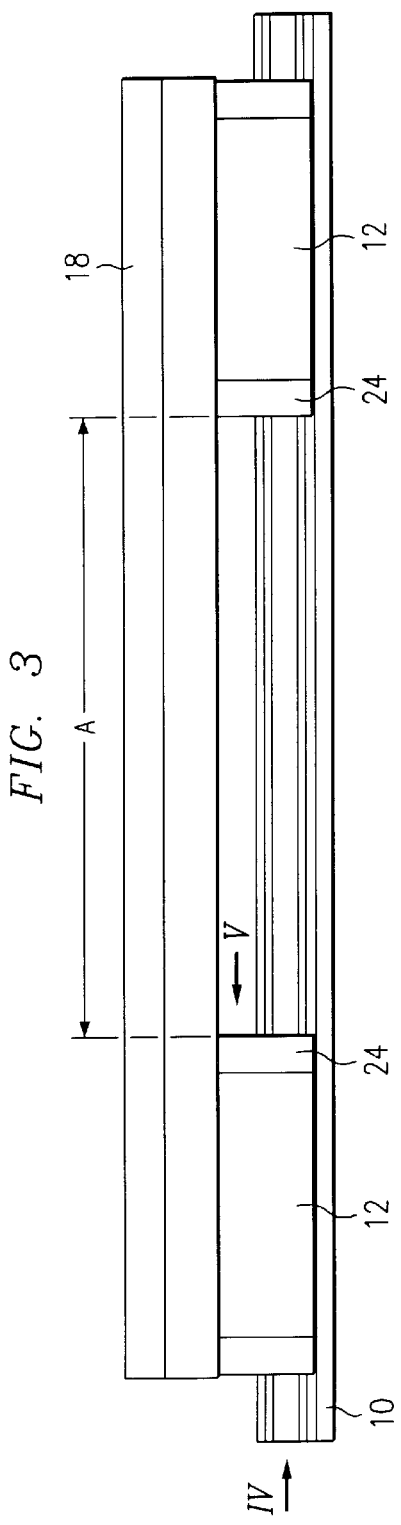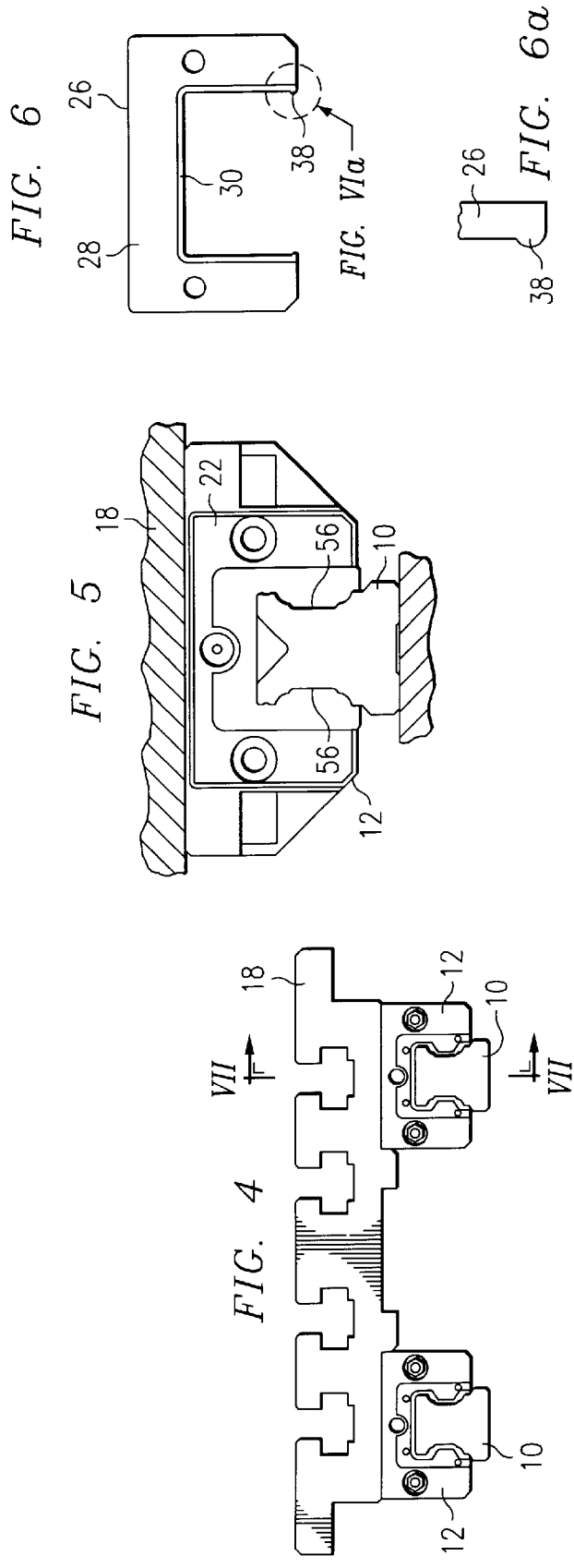

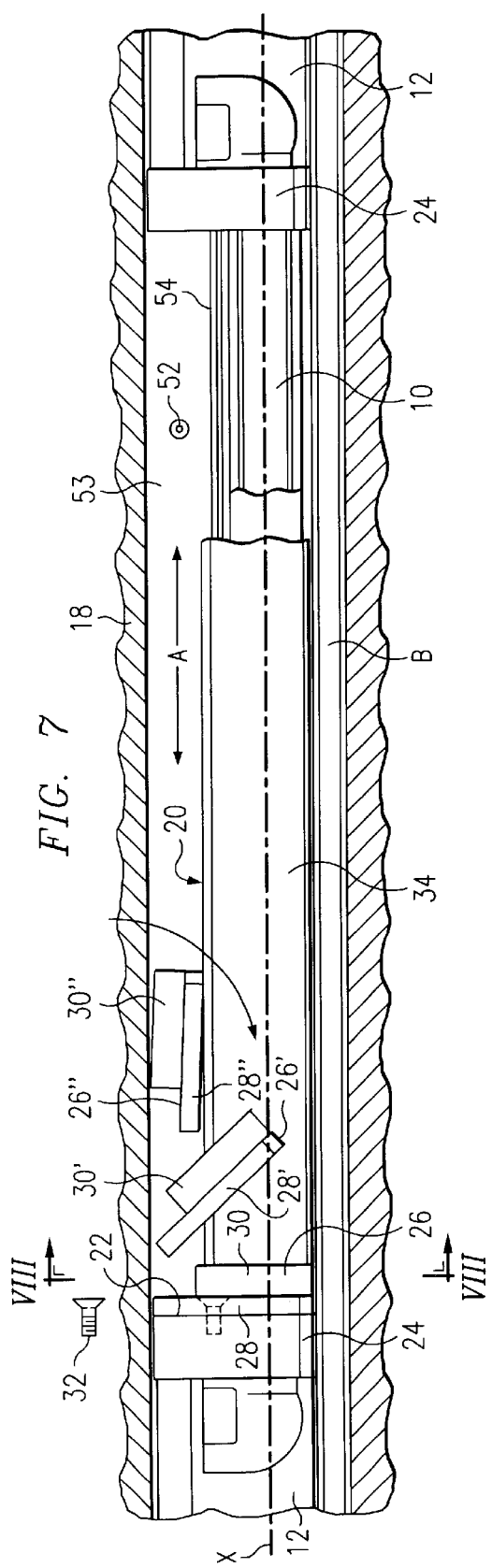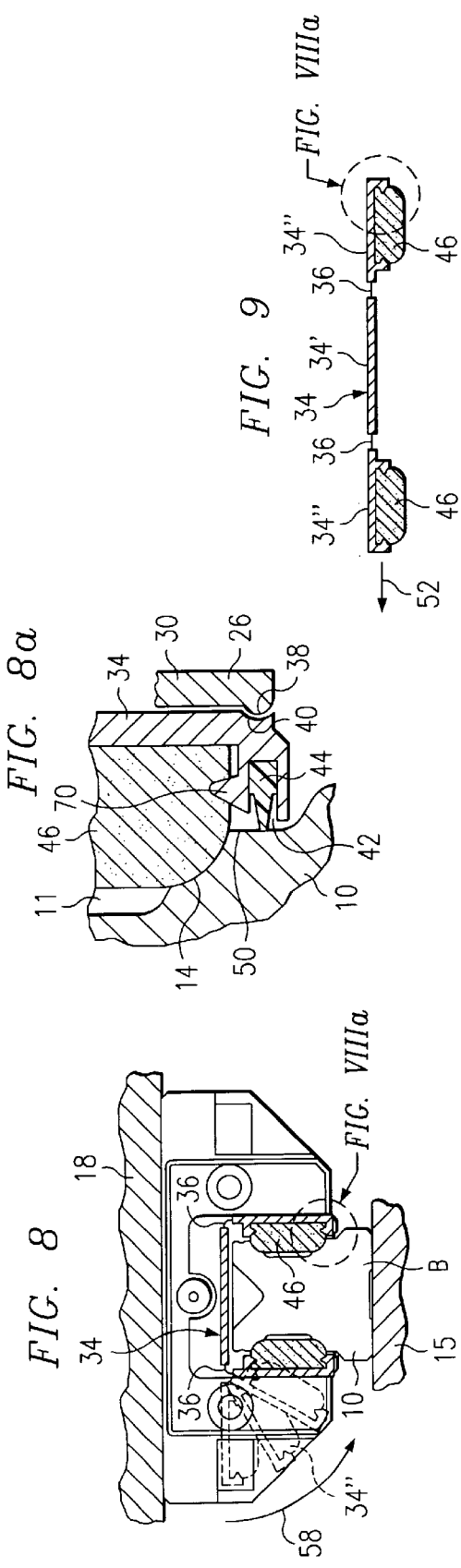

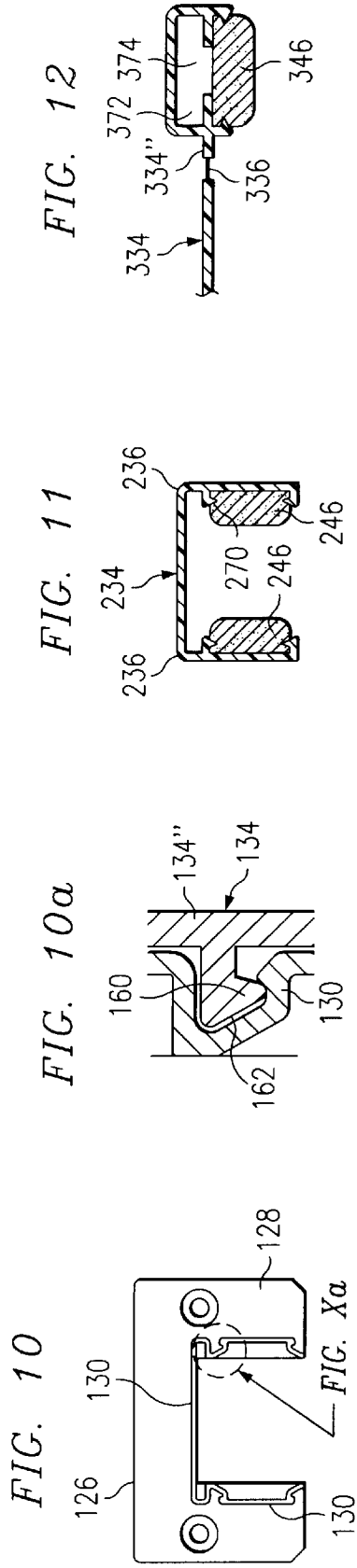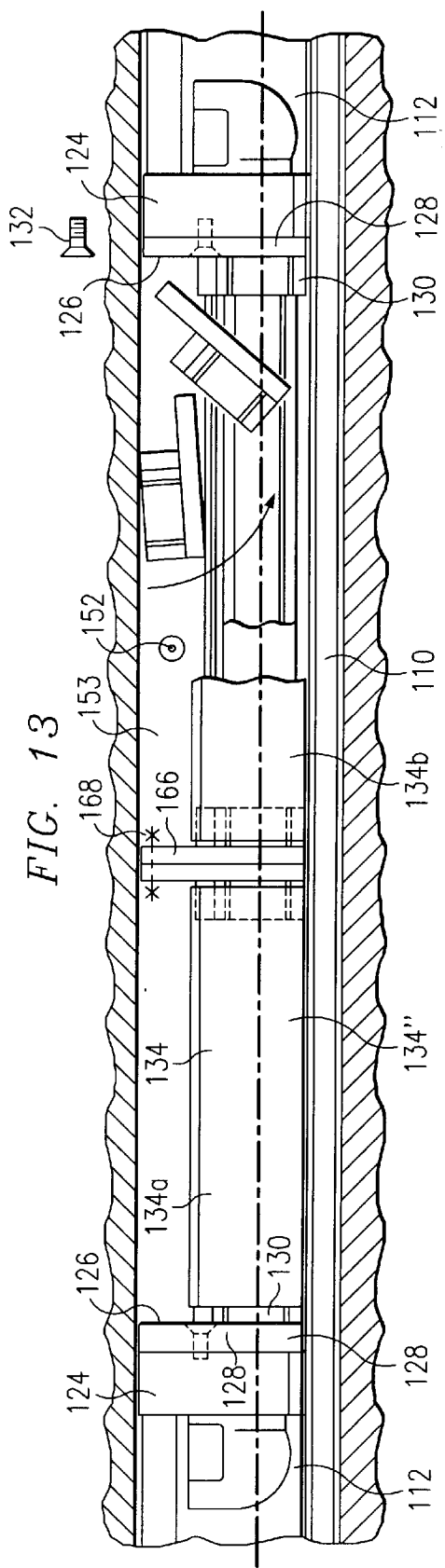

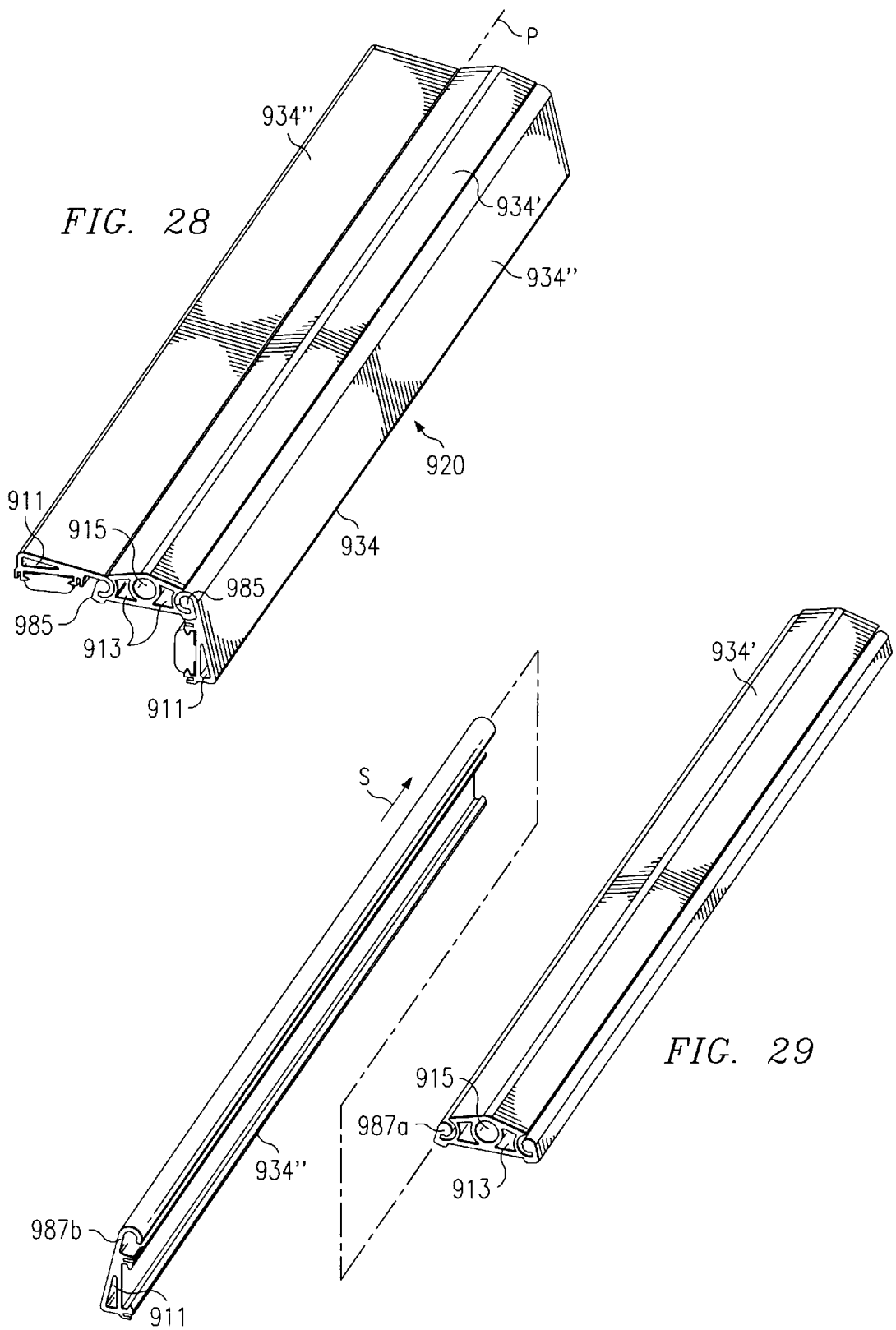

GUIDE UNIT

BACKGROUND OF THE INVENTION

The invention relates to a guide unit comprising at least one guide rail, optionally a rectilinear guide rail, this guide rail having a longitudinal axis and a rail profile with at least one track, also comprising at least two guide carriages guided on the at least one track of the guide rail with mutually facing ends and a covering means for covering the guide rail at least in a longitudinal portion of the guide rail between the two mutually facing end parts of the at least two guide carriages.

The covering part covering the guide rail protects the guide rail from contamination in guide units of this type.

STATEMENT OF THE PRIOR ART

It is known to use bellows as covering means; sheet metal angles are also conceivable.

OBJECT OF THE INVENTION

It is the object of the invention to provide a covering means which is improved with respect to ITS production and its handling when being fitted into the guide unit.

SUMMARY OF THE INVENTION

To achieve the above object, it is proposed according to the invention that the covering means makes a driving connection with the at least two guide carriages for common movement therewith and has a substantially rigid configuration in the axial direction between the two mutually facing ends at least over a portion of its longitudinal dimension.

In particular, it is intended that the covering means, at least over a portion of its longitudinal dimension, forms a covering means profile which approximately follows the rail profile at a distance from it—when viewed in a section orthogonal to the longitudinal axis. The covering means can define a substantially closed profile cavity between the rail profile and the covering profile, which contains the at least one track of the guide rail extending between the two guide carriages.

The profile cavity can be sealed in that the profile cavity is sealed, optionally substantially tightly by formation of a narrow gap and/or contact zone between the guide rail and the covering means. This seal of the profile cavity can, on the one hand, be used to prevent soiling of the guide rail from the surrounding space and, on the other hand, also help to prevent the discharge of lubricant and to prevent the lubricant used to lubricate the guide carriage and, in particular, the points of engagement of the guide carriage with tracks from issuing into the surrounding space. Both requirements arise in many applications of the guide unit, particularly if the guide unit is used in robot construction, in machine tool construction, in assembly machine construction and the like.

A frequent design of guide carriage is based on the principle that the guide carriage surrounds a guide rail, which is approximately rectangular in cross-section, in the form of a U, so the transverse web of the U-shaped guide carriage opposes a top face of the guide rail whereas the two outer arms of the U each oppose one lateral face of the guide rail, and a base of the guide rail opposing the top face is designed to be fastened on a carrier. Guidance can be effected by endless races of antifriction members arranged with a respective load-transmitting row of antifriction members in a track of the guide carriage and in a track of the guide rail. Balls, needles and rollers and the like can be used as antifriction members. With a design of this type, the covering means profile will preferably be constructed as a U-profile, wherein the ends of the arms of the U of the covering means profile can rest in a sealing manner on the guide rail.

The covering means profile can be assembled from at least two partial profiles following one another in a circumferential direction round the longitudinal axis. "Assembled" means that the partial profiles can be produced separately and rest with their rims or edges against one another. However, "assembled" also means that the U-profile parts adjoin one another in one piece or are connected to one another in the manner of a hinge.

If partial profiles of the covering means profile following one another in the circumferential direction are articulated to one another round hinge axes parallel to the longitudinal axis, then it is possible to mount and dispatch the covering means profile in an approximately laid-flat state, so storage space and transport space are saved. A further advantage is that laid-flat covering means profiles can be fitted on site even under restricted spatial conditions, for example if a table is already mounted on two or more guide carriages following one another. In this case, a laid-flat covering means profile can be introduced in laid-flat form through a gap between guide rail and table and can then be caused to cover the guide rail by pivoting the partial profiles round the hinge pins.

It is conceivable that the covering means profile is assembled from at least two covering profile portions adjoining one another in the longitudinal direction.

Exact fixing of the length of the covering means profile is unnecessary if the covering means profile has length compensating means for adaptation to variations in spacing between the two guide carriages.

The covering means, in the vicinity of at least one guide carriage, can have a covering means joining element for producing the driving connection to the respective guide carriage. There are a number of alternative designs for this. It is basically conceivable to mount the covering means profile on the associated guide carriage on its lateral faces extending parallel to the longitudinal direction, for example by clipping. It should be noted with this solution, however, that the covering means profile, if it is resting against a transverse web of a U-shaped guide carriage, could impair the connection between the guide carriage and the table. A preferred embodiment therefore proposes that the covering means profile is accommodated within the contour of the guide carriage.

The covering means profile can be constructed at one or both ends with a covering means joining element for joining to the respectively associated guide carriage. The joining elements could both be mounted rigidly on the covering means profile. Therefore, the covering means can only be used for normal solutions, however, in which the spacing between successive guide carriages is predetermined. The spacing between successive guide carriages often varies. To allow for such varying spacing, there are also various solutions: for example, the covering means profile can be assembled from two covering profile portions which are each connected only at one end to a covering means joining element. Covering profile portions of this type with a covering means joining element arranged rigidly thereon, for example with the maximum necessary length, can be injection moulded from plastics material and one or both covering profile portions can then be shortened at the end remote from the respective covering means joining element so the sum of the lengths of the two covering profile portions corresponds to the spacing between succeeding guide carriages. A coupling part, optionally in conjunction with a seal, can then be arranged at the abutting ends of the two covering profile portions.

However, the covering means joining elements and the covering means profiles can also be produced separately. This separate production affords the advantage that the covering means profile can then be prepared as piece or bar goods and the length required in each case can be cut from it. This allows simple production, for example by intrusion or extrusion. The covering means joining element can be connected to the covering means profile by pushing them together. Simple length compensation can also be achieved in this way. To allow handling of this type, the covering means joining element will preferably be constructed with a driving part and a profile gripping part, the latter interacting with the covering means profile. The profile gripping part can be constructed for contacting the exterior of the covering means profile or for interacting with the interior of the covering means profile.

The profile gripping part can be designed to straddle the covering means profile. This is of particular interest if the covering means joining element has only small dimensions in the direction of the longitudinal axis as the covering means joining elements can also be fitted easily in restricted spatial conditions.

It is possible that a clasping means resting externally against the covering means profile is provided for securing the covering means profile resting externally against the profile gripping part on the profile gripping part. The clasping means can have an approximately U-shaped configuration.

The covering means joining element can comprise, as fastening part, a fastening flange to be screwed or clipped on an end face of a guide carriage substantially orthogonal to the longitudinal axis. In an embodiment which is preferred in terms of manufacture and fitting, a respective covering means joining element is arranged on each of two guide carriages directly following one another, at the mutually facing ends thereof, and at least one separate covering profile portion extends between the two covering means joining elements.

If the covering means profile between two successive guide carriages is very long owing to the large spacing therebetween, it may be necessary to stabilise the covering means profile at a central position between the two guide carriages, particularly if a tight, in particular lubricant-tight covering is required. The stabiliser can at the same time form a coupling means between two covering profile portions directly adjoining one another.

If a covering means profile and a covering means joining element are produced separately and only connected to one another at a later stage, in particular as they are fitted into the guide unit, the cohesion during operation can be promoted if the profile gripping part can be locked to the covering means profile.

Length compensation which, in particular, is to allow fine adaptation of the covering means to the spacing between successive guide carriages can be achieved in that the length compensating means is formed by a sliding section on a covering means joining element and/or between two covering profile portions adjoining one another.

Lubricant for lubricating the at least one track can be provided within the covering means. If the track is lubricated in this way, it may be unnecessary to supply lubricant to the guide positions of the guide carriages running on the respective track. The advantage then arises that lubricant supply systems within the guide carriages can be avoided under certain circumstances. This advantage is significant in so far as it may be difficult to provide a lubricant supply within guide carriages owing to the restricted space, particularly in the case of guide carriages constructed with races of antifriction members.

There is generally abundant space for accommodating lubricants within the covering means, so long-term lubrication or even service-life lubrication can be supplied. However, refilling with lubricant should not be ruled out. In this case, nipples or the like can easily be provided on the covering means profile.

High-viscosity lubricating greases as well as low-viscosity lubricating oils can be used as lubricant. The lower the viscosity of a lubricating oil, the more careful the seal obviously has to be.

If lubrication is to be carried out using lubricating oil, it is possible to provide at least one porous lubricant-containing oil distributor within the covering means. This oil distributor can make lubricant delivery contact (lapping contact) with a track of the guide rail.

If lubricant is also required within the guide carriage, the lubricant within the covering means can have access to lubricant-demanding positions within the guide carriage.

If the covering means, for achieving a good seal, is making frictional contact with contact zones of the guide rail, it may be advantageous for the service life of the covering of the guide rail if the lubricant within the covering means has access to a narrow point or a contact zone between the guide rail and the covering means.

The oil distributors can be extended basically over the entire length of the spacing between two successive guide carriages. As a result, there is already a large quantity of lubricant in the oil distributor, which may be adequate for long-term lubrication or service-life lubrication. However, the oil distributor should also be able to make a lubricant-conveying connection to a storage space for unbound lubricant. In this way, the quantity of lubricant available is further increased and the time interval between successive replenishments with lubricant is increased. If an oil distributor, for example in strip form, is provided on the covering means profile, an internal bias in the covering means profile or also a bias applied by external biasing means can ensure that the oil distributor is invariably pressed into lubricant-delivering contact with the track.

If the spacing between successive guide carriages is very long, it may be desirable to allow the oil distributor—for example through recesses—to rest against the track only over a portion of this length in order to prevent excessive frictional force in this way.

The parts of the covering means can be injection moulded, cast, extruded, drawn or bent from plastics material or metal.

With the aforementioned guide carriages comprising races of antifriction members in a U-shaped carriage member, the carriage member was formerly constructed with a sealing element at both ends, so that the lubricant within the carriage member was restricted to the length region of the carriage member and no lubricant passes to the respective guide rail portions not covered by the carriage member. With the construction according to the invention, it is possible to dispense with the sealing elements of the guide carriages facing the intermediate space between successive guide carriages if the space enclosed by the covering means is constructed in a lubricant-tight manner.

It is possible to provide, on the covering means, at least one sliding face which makes sliding engagement with a slideway of the guide rail. In comparison with the alternative embodiment in which the covering means is guided on the guide rail only indirectly via the guide carriage, the solution with a sliding face on the covering means and a slideway on the guide rail, which make sliding engagement, affords the advantage that, even with very great spacing between two successive guide carriages, deformations of the covering means can be avoided if it is brought into sliding engagement with the slideway of the guide rail at one or more points. Owing to the production of this sliding engagement, the covering means can be structurally weaker in design without running the risk of deformation, even if very great distances between successive guide carriages are to be bridged over.

The slideway with which one or more sliding faces of the covering means is to be brought into sliding engagement, can be formed by a track of the guide rail, in other words a track on which the guide carriage itself runs in a rolling or sliding manner.

However, as peripheral portions of greater size, not required by the tracks or track, are available at the cross-sectional contour of the guide rail, it is also conceivable for the slideway for engagement of a sliding face of the covering means to be separated from the track or the tracks for the guide carriages. The first option affords the advantage that it is not necessary to take further steps on the guide rail for forming the slideway or slideways apart from the track or tracks already required for guiding the guide carriage or carriages. The second option affords the advantage that track wear is avoided owing to the sliding engagement with one or more sliding faces of the covering means and lubrication of the track can be focused merely on the requirements of guide carriage guidance.

In the embodiments of the invention discussed hitherto, it was hinted that the covering means could be connected to at least one of the guide carriages adjoining it by fastening it on the respective guide carriage.

It is proposed in an embodiment which is preferred under certain circumstances, however, that the covering means merely makes pressure-transmitting contact with at least one of the guide carriages; in other words: the driving connection is provided by pressure transmitting contact. To understand this step, it should be remembered that two successive guide carriages, between which a covering means is to be placed, are frequently already connected to one another by a bridge, a table or another object and are therefore spaced apart so that the covering means does not have to act as a spacer in any case. Under these circumstances, adequate positioning of the covering means is ensured if the covering means on the one hand is guided on the guide rail by at least one, preferably several sliding faces and on the other hand, merely makes pressure-transmitting contact with the mutually facing end parts of the guide carriage. This embodiment has the further advantage that the mounting of the covering means is greatly simplified; it is merely necessary to bring the covering means with its guide face or its guide faces into sliding engagement with the slideway or the slideways of the guide track and to bring together the guide carriages with their mutually facing end parts until they contact the respectively associated ends of the covering means and to fix the mutual spacing thus obtained. The covering means can be isolated in terms of transverse force from at least one of the guide carriages; it is preferably isolated in terms of transverse force from both guide carriages. The expression "isolated in terms of transverse force" denotes that the respective end of the covering means is displaceable at least slightly in the transverse direction to the guide rail in relation to the associated end part of a guide carriage. This prevents double passes which might otherwise occur if, on the one hand, the covering means is guided directly on the guide rail by sliding face slideway engagement and, on the other hand, one or both ends of the covering means are fastened on one or both guide carriages.

If the spacing between two successive guide carriages is predetermined by an object connected to both guide carriages, for example by a table, it must be ensured, for optimum enclosure of the respective guide rail portion located between the two guide carriages, that the length of the covering means corresponds as exactly as possible to the internal clearance between two mutually opposed end faces of the two guide carriages, in particular the spacing between the end faces, turned to one another, of end parts of the two guide carriages. It is therefore recommended that the covering means rests with a bias against the mutually facing end parts of the guide carriages. It is then possible elastically to shorten the length of the covering means in adaptation to the spacing between the two guide carriages determined by extraneous means and simultaneously to ensure close contact between the ends of the covering means and the end faces of the guide carriages.

Depending on the application, it is advisable to supply the sliding face of the covering means or/and the slideway of the guide rail with lubricant. If the slideway is identical to at least one track of the guide rail and if the track, in turn, is to be lubricated, smooth running of the sliding face of the covering means can be ensured by lubrication of the track.

If there is sufficient spacing from the guide rail to be covered, the covering means provides adequate space for accommodating a supply of lubricant if the track of the guide carriage is to be lubricated or if a slideway for the covering means is to be lubricated or also if specific functional parts within a guide carriage are to be lubricated, for example a race of balls or a race of rollers. The term "supply of lubricant" at this point covers the case, on the one hand, where a lubricant store is to be accommodated within the covering means for a prolonged period, possibly for the entire service life of the guide unit, and, if necessary, also the distributor, in order to bring the lubricant to lubricant-demanding positions. The term "supply of lubricant" at this point should also cover the possibility that lubricant, whether lubricating oil or lubricating grease, is continuously supplied from the exterior, for example via a flexible line, to the covering means and distributors are provided within or on the covering means in order to guide the lubricant to the respective lubricant-demanding positions.

The covering means can consist of at least two covering means parts adjoining one another in the direction of the longitudinal axis. This means inter alia that at least one end of a covering means close to the guide carriage can be produced separately from the part of the covering means bridging the remaining length. The part of the covering means close to the guide carriage can be adapted to its function of contact with the guide carriage, and the part of the covering means intended to overlap the remainder of the guide rail can be produced most simply as a covering means profile having a constant cross-section over its entire length and can therefore be produced easily to any length by production processes such as extruding, intruding, extrusion, drawing or bending.

Furthermore, the term "at least two covering means parts adjoining one another" should also cover the case where a part of the covering means covering the majority of the length between two successive guide carriages and two covering means end pieces which are adapted to their contacting function with respect to the guide carriage, follow one another in the longitudinal direction. The case should also be covered where two or more parts of the covering means of greater length follow one another, for example if a store of standard length pieces of the covering means is available and a specific length between two successive guide carriages is to be bridged by a series arrangement from this store. It is then necessary to measure only the predetermined spacing between two guide carriages and to divide it by the standard length of the available parts of the covering means. The resultant number is the number of parts of covering means required. According to the remainder, a further covering means part is shortened and also included in the series arrangement. This method of assembling a covering means is possible, in particular, if sliding faces of the covering means are provided in each case in the region where two successive covering means parts abut. The problem of tolerance compensation can then be achieved by providing biasing means on at least one of the covering means parts so that the series of covering means parts can be compressed in adaptation to the respective clear length between two successive guide carriages.

According to a common embodiment, the covering means comprises at least one covering means profile and at least one covering means end piece which is designed to rest against a guide carriage. A compressible spring means can be provided between the covering means profile and the covering means end piece. This spring means can be provided, in particular, on the covering means end piece which cannot be produced by extrusion, drawing or the like in any case, but has to be produced by a casting or injection moulding process. With a casting or injection moulding process of this type, the spring means can be produced coherently from the material of the covering means end piece in one piece with it.

If the covering means consists of at least two covering means profile portions which follow one another in the direction of the longitudinal axis, these covering profile portions can be connected to one another by a coupling piece. This does not necessitate special coupling measures on the covering profile portions. It is merely necessary to design the coupling piece for coupling and to plug the covering profile portions together by means of the coupling piece. The coupling piece can therefore be a coupling piece which is separate from the two covering profile portions, and any spring means required can also be provided on the coupling piece and can, in turn, be shaped from the material of the coupling piece in one piece with it by casting or injection moulding. To sum up, it can be stated that the covering means can comprise at least one covering means profile and at least one plug-on part. "Plug-on part" in this connection therefore denotes coupling piece as well as covering means end piece. In any case, at least one plug-in pocket can be formed on the plug-on part to receive the associated end of a covering means profile. It is obviously desirable to shape the plug-in pockets on a coupling piece and on a covering means end piece so as to be identical in profile so that each plug-on piece fits each covering means profile.

The covering means profile can be designed as a hollow wall profile. Production of the covering means profile as a hollow wall profile affords the advantage that the covering means profile is stiffened without a significant increase in weight. This stiffening is desirable both with respect to the dimensional stability of the covering means profile against the action of gravity and with respect to improved protection of the guide rail from impacts from the exterior.

Production of a covering means profile as a hollow wall profile also affords various possibilities for plugging together plug-on parts such as covering means end pieces and coupling pieces on the one hand and covering means profiles on the other hand. Thus, at least one plug-in projection can be provided on a plug-on part for plugging into a hollow profile chamber of a hollow wall profile. The sliding face of the covering means for sliding on a slideway of the guide rail can basically be formed directly on a coupling piece or a covering means end piece or a covering means profile.

If the sliding face of the covering means is formed by a separate sliding block, this has the advantage that the sliding block which is occasionally subjected to rapid wear can be exchanged without having to exchange the entire covering means. If a decision is made to mount the sliding face of a covering means on a separate sliding block or sliding blocks, these can therefore basically be mounted on covering means profiles or on associated plug-on parts, for example coupling pieces or covering means end pieces. It is advantageous, for practical reasons, if the sliding blocks are mounted on the covering means profile as holding profile means for receiving one or more sliding blocks can also be shaped easily during profile production.

A sliding block can basically extend over a substantial part or even over the entire length of the spacing between two successive guide carriages. For the sake of economy and to minimise frictional force, however, it is frequently desirable to provide sliding blocks of a substantially shorter length, for example in an end region of the covering means close to a guide carriage or even at a central point of the spacing between two guide carriages if it is necessary to prevent bending of the covering means. In the latter case, sliding blocks will preferably be mounted in the region of a coupling piece between two successive covering means profile portions participating in the formation of the covering means.

The sliding block can basically be designed as a lubricating member for lubricating a track or/and a slideway. For example, the sliding block can consist of a plastics material which, on the one hand, is hard enough to perform a stabilising guiding function but, on the other hand, is porous and contains solid or liquid lubricant in its pores.

However, the supply of lubricant is not linked to the use of the sliding block as a lubricating member; rather, it is possible to apply the lubricant to the respective lubricant-demanding surfaces without using the sliding block; it is thus possible that at least one lubricant dispenser is provided on the covering means next to a sliding block in the direction of the longitudinal axis, this lubricant dispenser being suitable for supplying lubricant to a track or/and a slideway. In this case, the material properties of the lubricant dispenser can be adapted specifically for the storage and delivery of lubricant without reference to the function of guidance.

The covering means can be provided with longitudinal sealing strips which are arranged opposite the guide track in the sealing position and, together with the guide rail, form an enclosure for at least one track or/and at least one slideway. The term "sealing" here denotes both sealing by physical contact and sealing in which the covering strips extend so close to the respective surface of the guide rail that the remaining gap is small enough to prevent the admission of dirt, without sliding contact. Even if the covering means is guided directly on the guide rail due to interaction of sliding faces and slideways independently of the guide track, perfect sealing is expected as the risk of a loss of seal due to a double fit is reduced.

As already mentioned hereinbefore, the covering means frequently has a U-shaped configuration in order to cover a guide rail with head part, lateral faces and foot part. It will be adequate and even desirable for many applications to allow the lateral arms of the covering means to extend not right to the foot part and not to a base carrying the foot part.

On the other hand, however, situations cannot be ruled out in which the lateral parts of the covering means will extend down to the foot part or to a base carrying the foot part. For this purpose, holding means can be provided on the covering means for the mounting of covering supplements, thus affording the advantage that a substantial part of the covering means, namely the U-shaped profile member, can be retained and, if necessary, only needs to be supplemented by the covering supplement. These covering supplements are not only provided and suitable for covering an uncovered foot part of the guide rail and for providing a seal from a base carrying the guide rail, but it is also conceivable to design the covering supplements in such a way that they provide a lateral covering for a guide carriage combined with the covering means. A covering supplement can also be designed as a seal from an object, in particular table, carried by at least one guide carriage. It is thus possible, with a modular system having a relatively small number of standard parts, to achieve a more or less complete enclosure, as required, which covers only parts of the guide rail as required or encloses the entire space between a base carrying the guide rail and an object carried by the guide carriage, possibly also in the region of the guide carriage itself.

The holding means for the mounting of covering supplements can be designed as a supplement holding profile which, in turn, is mounted on a covering means profile where it can easily be shaped by corresponding design of drawing dies, extrusion dies, or the like during production of the covering means profile.

Adapters which can be brought into engagement with a holding profile of the covering means on the one hand and with a coupling profile of the covering supplement on the other hand, for example by sliding them in axially or by snapping or hooking them in, can be provided for connecting covering supplements to a covering means profile. In particular, adapters of this type should be so designed that they can be used selectively for connecting the covering means to various covering supplements.

Reference has already been made to the possibility of also using a covering means to accommodate a supply of lubricant. The possibility of accommodating, in the covering means, a lubricant duct extending in the longitudinal direction of the guide rail should, however, also be added. This possibility of accommodating a lubricant duct exists, in particular, if the covering means is produced with covering means profiles produced by extrusion, intrusion or drawing.

If a lubricant duct of this type is provided, it can make a lubricant-conveying connection with a lubricant delivery point or/and with a track or/and with a slideway or/and with a lubricant joining orifice of at least one guide carriage. For example, the lubricant delivery point can be via a flexible hose with a lubricant pump or a lubricant press or a lubricant store subjected to gravity.

As the guide carriages frequently have, at their end parts, a central lubricant joining orifice into which a lubricating nipple has generally been inserted in the past, it is advisable to position a lubricant duct in such a way that, after assembly of a covering means with two successive guide carriages, it is axially aligned with the central, axially orientated lubricant joining orifices of the guide carriages. The tight connection between the lubricant duct and the lubricant connections in the end pieces of the guide carriages can have a blunt configuration such that, owing to the connection between lubricant duct of the covering means on the one hand and the lubricant connections of the guide carriage on the other hand, the isolation, in terms of transverse force, of the covering means and the guide carriage is not eliminated.

The connection between the lubricant duct in the covering means and a lubricant store can be produced, for example, in the region of an end piece or/and a coupling piece. There is an unrestricted possibility for connection of a flexible hose or the like in the region of the coupling piece as the respective guide carriage is far removed there.

If the guide unit is connected to a linear drive which is to transport the guide carriage in the longitudinal direction of the guide rail or guide rails, this linear drive also frequently requires lubricant. This applies, for example, if a spindle drive, in particular a spindle drive with a ball nut is used as linear drive. A lubricant duct integrated into the covering means can also communicate with the lubricant supply of the linear drive in such cases.

The seal of an enclosed space created by the covering means in the environment of a guide rail is not quite completed by sealing strips extending in the axial direction of the guide rail. A seal is also required where the covering means abuts against a guide carriage. Sealing means can also be provided there. Furthermore, sealing means can also be provided where two successive covering profile portions abut with a coupling piece.

Every endeavour will be made to mount sealing means of this type on covering means end pieces or on coupling pieces, as the production of these parts most easily allows the simple mounting of sealing means.

The coupling pieces between successive covering profile portions already mentioned several times are relatively complicated shaped articles and they become even more complicated if, as already indicated, lubricant ducts and branches from these lubricant ducts also extend in the region of the coupling pieces. To simplify the shaping here, it is proposed that the coupling piece is assembled from two preferably identical mouldings which abut in a connecting plane orthogonal to the longitudinal axis.

The covering means can be a body which is closed in on itself; in particular, a covering means profile associated with the covering means can be rigid in itself, for example U-shaped. To simplify production of the covering means and to simplify installation of the covering means into a guide unit, however, the covering means can comprise a covering means profile with a plurality of profile wall parts which adjoin one another round the longitudinal axis in the circumferential direction and are articulated to one another. The profile wall parts can be constructed with hinge parts to allow the profile wall parts to pivot relative to one another round hinge axes parallel to the longitudinal axis. These hinge parts can be pivoted relative to one another and brought into an interlocking position in which the profile wall parts define a profile cross-sectional shape suitable for covering the guide rail. The hinge parts can be connected to one another by being pushed together axially or by hooking.

BRIEF DESCRIPTION OF THE DRAWINGS

The invention will be described in greater detail below by reference to the forms of embodiment as represented in the drawings, wherein:

FIG. 1 shows a guide rail with guide carriages as a basis of the invention;

FIG. 2 is a section along line II—II in FIG. 1;

FIG. 3 is a side view of a guide unit according to the invention with two guide rails, two respective guide carriages on two guide rails, a table carried by the guide carriages and an intermediate space between two respective successive guide carriages, suitable for the fitting of a covering means;

FIG. 4 is an end view in the direction of the arrow IV in FIG. 3;

FIG. 5 is an end view in the direction of the arrow IV in FIG. 3 of the end of a guide carriage;

FIG. 6 shows a covering means joining element suitable for mounting on the end face of a guide carriage shown in FIG. 5;

FIG. 6a shows a detail of FIG. 6;

FIG. 7 shows a possible fitting process for the covering means in a guide unit according to FIG. 3 in a section along line VII—VII in FIG. 4;

FIG. 8 is a section along line VIII—VIII in FIG. 7;

FIG. 8a is a detail at VIIIa in FIG. 8;

FIG. 9 is a laid-flat covering means profile pertaining to the covering means joining element according to FIG. 6;

FIG. 10 is an alternative embodiment of a covering means joining element as an alternative to that in FIG. 6;

FIG. 10a shows the detail Xa from FIG. 10 on an enlarged scale;

FIG. 11 shows a modified covering means profile as an alternative to that in FIG. 9;

FIG. 12 shows a further modified embodiment of a covering means profile with a lubricant chamber;

FIG. 13 shows an assembly process during the assembly of a covering means using covering means joining elements according to FIG. 10;

FIG. 28 shows a covering means assembled from several profile wall parts following one another in the circumferential direction round the guide rail;

FIG. 29 shows the process of assembling two successive profile wall parts;

FIG. 32a shows an adapter as link between a covering means and a covering supplement;

FIG. 32b shows a covering supplement for covering a guide rail foot part;

FIG. 32c and FIG. 32d show covering supplements for covering guide carriages;

DETAILED DESCRIPTION OF PREFERRED EMBODIMENTS

Figure 14:
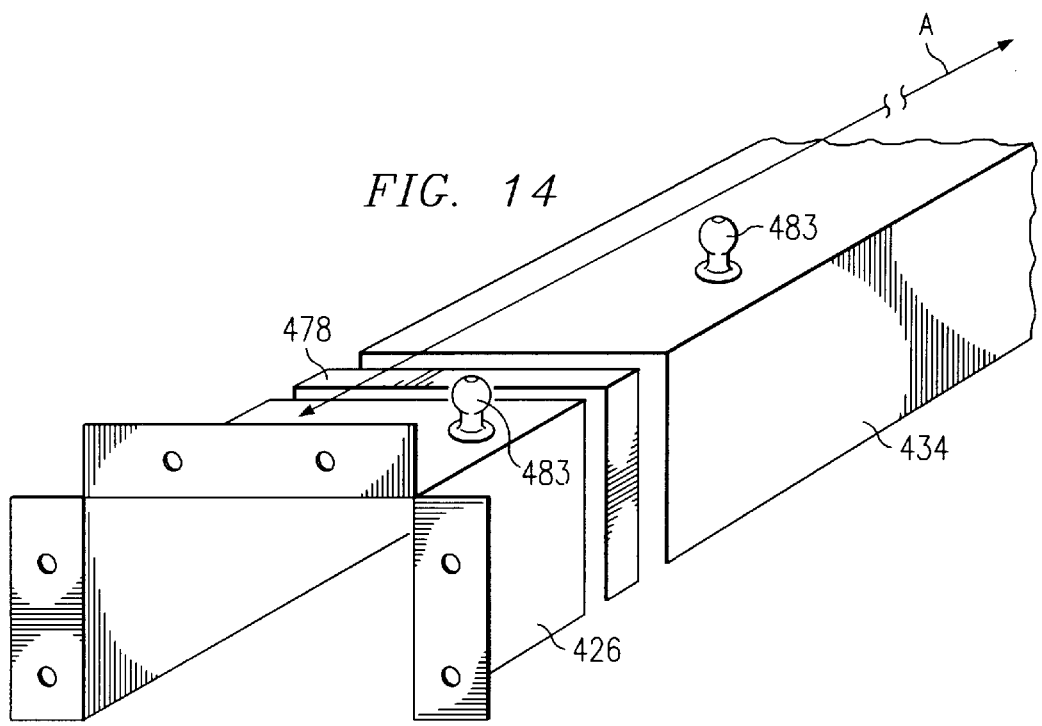
FIGS. 14 and 15 are basic sketches illustrating further possible variations.

FIGSa. 1 and 2 are taken from DE-OS 36 20 571 A1, the corresponding EP 0 211 243 A2 and the corresponding U.S. Pat. No. 4,743,124. Reference is made to these documents for further information about the construction of the module according to FIGS. 1 and 2.

A guide rail is designated by 10 in FIG. 1; it comprises a base part B which is fastened on a carrier 15. A guide carriage 12 runs on this guide rail. The guide carriage 12 is guided on guide tracks 14 of the guide rail 10 by means of ball races 16, as described in detail in the above-mentioned patents.

In FIGS. 3 and 4, two respective guide carriages 12 on which an object table 18 is fastened are guided on two guide rails 10 running in parallel. The spacing between the respective guide carriages 12 running on a guide rail 10 is determined by the guide table and designated by A. In the region of the spacing A in FIG. 3, the guide rail 10 is to be covered by a covering means designated quite generally by 20 (see FIG. 7).

An end face 22 is formed on the left-hand guide carriage 12 according to FIGS. 4 and 7. This end face 22 is part of a headpiece 24 within which the ball races 16 experience their change of direction according to FIG. 2.

A U-shaped covering means joining element 26 according to FIG. 6 is fastened on the end face 22. This covering means joining element 26 consists of a fastening flange 28 and a profile gripping part 30. The fastening flange 28 is fastened on the end face 22 by fastening screws 32. The foregoing also applies to the right half of FIG. 7, i.e. to the other guide carriage 12. A covering means profile 34 which is shown laid flat in FIG. 9 is accordingly bent to the U-shape according to FIG. 8 by bending at right angles in film hinges 36. The U-shaped covering means profile 34 obtained in this way can then be plugged into the profile gripping part 30 on both guide carriages 12, for example in such a way that it is initially pushed into the profile gripping part 30 on one guide carriage 12 and the two guide carriages are then brought toward one another. Beads 38 of the profile gripping parts 30 come to rest in holding grooves 40 of the covering means profile 34, as shown clearly in FIG. 8a. Seal-receiving chambers 42 which receive the sealing strips 44 are mounted on both arms of the covering means profile 34. These sealing strips 44 make tight contact with the guide rail 10, as also shown clearly in FIG. 8a.

The production of a seal even at the ends of the covering means profile 34 is ensured by appropriate design of the covering means joining element 26 with associated sealing means and by appropriate design of the guide carriages 12.

It can be seen from FIGS. 8, 8a and 9 that lateral regions of the covering means profile 34 facing the tracks 14 are provided with porous oil distributors 46 which come into contact with the tracks 14 when the covering means profile 34 is applied. These oil distributors 46 extend over the entire length of the covering means profile 34. They are impregnated with lubricant. Impregnation with lubricant forms a long-term lubricant store. Owing to the lubricant delivered to the tracks 14 during displacement of the guide carriage 12, the region of contact between the ball races 16 and the tracks 14 is lubricated and transfers itself via the balls also onto the tracks formed on the guide carriages 12 for the balls of the ball races 16. To achieve intensive wetting with oil in the region of the ball races 16, it is proposed that, according to FIG. 1, the space 48 at one end of the guide carriage 12 which is basically intended—for other applications—to receive a stripping seal resting closely on the rail profile, is not occupied by a seal in the present case. A seal is obviously inserted into the recess 48 at the other end of the guide carriage 12 in FIG. 1.

In FIG. 8, the race zone between the sealing strip 44 and the guide rail is designated by 50. To minimise abrasion due to friction at this point, the oil distributor 46 can be continued into the loop zone 50, more specifically into the immediate vicinity of the point of contact between the sealing strip 44 and the race zone 50, so friction and abrasion are minimised there.

FIG. 7 indicates a further method of assembling the rail covering 20. FIG. 7 shows that the object table 18 is already fastened on the guide carriage 12 and the spacing A between the two guide carriages 12 is therefore already fixed. Owing to the design of the covering means parts 26 and 34, the covering can also be assembled in this state of construction. In this state, the laid-flat covering means profile 34 can be plugged in the direction of the arrow 52 in FIGS. 7 and 9 into the gap 53 between the object table 18 and the top face 54 of the guide rail 10 so the central region 34' of the laid-flat covering means profile 34 comes to rest over the top face 54. The regions 34" can then be folded by means of an auxiliary tool, for example a clamp, against the lateral faces 56 of the guide rail 10 so that the covering means profile 34 initially laid flat assumes the U-shape according to FIG. 8. The covering means joining elements 26 can subsequently be pushed into the gap 53 in the orientation 26" according to FIG. 7, can then be pivoted into the orientation 26' where they straddle the covering means profile 34 and the covering means joining elements 26 can then finally be placed on the end face 22 with their fastening flange 28 in the orientation 26 according to FIG. 8 and can be screwed there by means of the screws 32. This process can be carried out on the two guide carriages 12 according to FIG. 7. The beads 38 snap into the holding grooves 40 so that the covering means profile 34 is finally also secured against vertical movement. The covering means profile 34 is also secured in the axial direction X by impact against the covering means joining elements or the guide carriage 12. As the covering means profile 34 can be moved in the axial direction X into the profile gripping parts 30 and a seal is produced with the covering means profile 34 due to the overlapping of the profile gripping parts 30, exact adaptation of the axial length of the covering means profile 34 to the spacing A between the guide carriages 12 is not required.

The lubricant distributor 46 can extend over the entire length of the covering means profile 34 so adequate lubrication of the ball races 16 can be relied upon promptly on recommencement of the movement even after a prolonged stoppage of the guide carriages 12. As the oil distributor 46 rests under pressure on the respective track 14, excessive friction for the travelling module formed by the guide carriage 12 and the object table 18 can be produced if the oil distributor 46 has a great length. This friction can be limited in that the oil distributor 46 is interrupted at intervals along the direction X or is provided with recesses. It can readily be seen that the covering means 20 can also be removed again as in the above-described assembly according to FIG. 7 if, for example, the oil distributor 46 and/or the sealing strips 44 are to be replaced due to wear.

It should be added with respect to FIG. 8 that the process of folding the regions 34" of the covering means profile 34 is indicated by the swinging arrow 58 and by the various angular positions of the region 34".

In FIG. 10, similar parts are provided with the same reference numerals as in FIG. 6, increased by the number 100 in each case. A different configuration of the profile gripping part 130 is shown therein. As also shown, in particular, in FIG. 10a, this profile gripping part 130 is so designed that a covering means profile 134 can be applied to the profile gripping part 130 from the exterior and can be locked to it. For this purpose, a hook 160 is formed on the region 134" of the covering means profile 134 and snaps into a groove 162 of the profile gripping part 130 when the region 134" is folded back. The covering means joining elements 126 can then be fastened on the guide carriages 112 in advance by screws or by snap-on connectors, and the covering means profile 134 can subsequently be pushed into the gap 153 in the direction of the arrow 152, as described with reference to FIG. 7.

The snap-on engagement shown in FIG. 10a can then be produced by folding back the regions 134". Assembly of the covering means profile 134 is then basically complete.

FIG. 13 additionally shows that the covering means profile 134 consists of two covering profile portions 134a and 134b which are connected to one another by a stabilising arc 166. The stabilising arc 166 can be assembled from two covering means joining elements 126 of which the fastening flanges 128 are back to back. Owing to the stabilising arcs 166, on the one hand, the two covering profile portions 134a and 134b—if required—are tightly connected to one another. On the other hand, the regions 134" of the covering means profile 134 are also stabilised against lifting from the rail. This is particularly important if oil-tight contact between the regions 134" and the guide rail 110 is to be ensured. The covering means joining elements 126 forming the stabilising arcs 166 can be connected to one another by a screw joint 168.

As sealing elements which rub over the entire periphery of the guide rails 10 and 110 can be provided at the two ends, remote from one another, of the guide carriages 12 and 112, as already mentioned, the lubrication of the guide rail, for example by correspondingly designed oil distributors, can be so designed that adequate lubrication is ensured wherever friction occurs between the end seals of the guide carriages 112 and the guide rail 110, so no wear occurs even there owing to the seals inserted into the spaces 48 at the ends of the guide carriages remote from one another.

The covering means profile 134 in FIG. 13 can be removed as with the above-described assembly by appropriate reversal of the procedure.

To ensure further stabilisation of the covering means profiles 34 and 134—in particular if the length of the spacing A is great—stabilisers for the covering means profile 34 and 134 can be positioned at any points between the guide carriages 12 and 112. These stabilisers can be formed, for example, by resilient U-shaped clips which can be fitted similarly to the covering means joining elements, for example according to the sequence of orientations 26", 26', 26 in FIG. 7 and enable, in particular, lubrication by the oil distributors 46 to be ensured and also the seal by the sealing strip 44 to be ensured.

FIG. 11 shows that the film hinge can also be dispensed with if the covering means profile 234 is produced from a material which is sufficiently flexible to allow kinks in the corners 236. According to FIGS. 8a and 11, the oil distributors 46 and 246 can be held by pointed profiles 70 and 270 which can consist, for example, of felt or an open-cell polymer foam.

FIG. 12 shows a further modified embodiment of a covering means profile 334. Similar parts are again provided with the same reference numerals as in the preceding embodiments, increased in each case by the number 300. It can be seen that chambers 372 for receiving unbound lubricant are formed in the regions 334" by configuring the respective profile. These chambers make a final saturation connection to the oil distributors 346 through slots 374.

It is indicated schematically in FIG. 14 that any coupling means 478 which can also be used for stabilisation, if desired, can be inserted between a covering means joining element 426 and a covering means profile 434. It is assumed in FIG. 14 that the covering means joining element 426 is again relatively short and the majority of the spacing A is bridged by the covering means profile 434. The covering means profile 434 can be injection moulded from plastics material by the extrusion or intrusion process. Any plastics injection moulding or casting process is suitable for producing the covering means joining elements 426.

Figure 15:
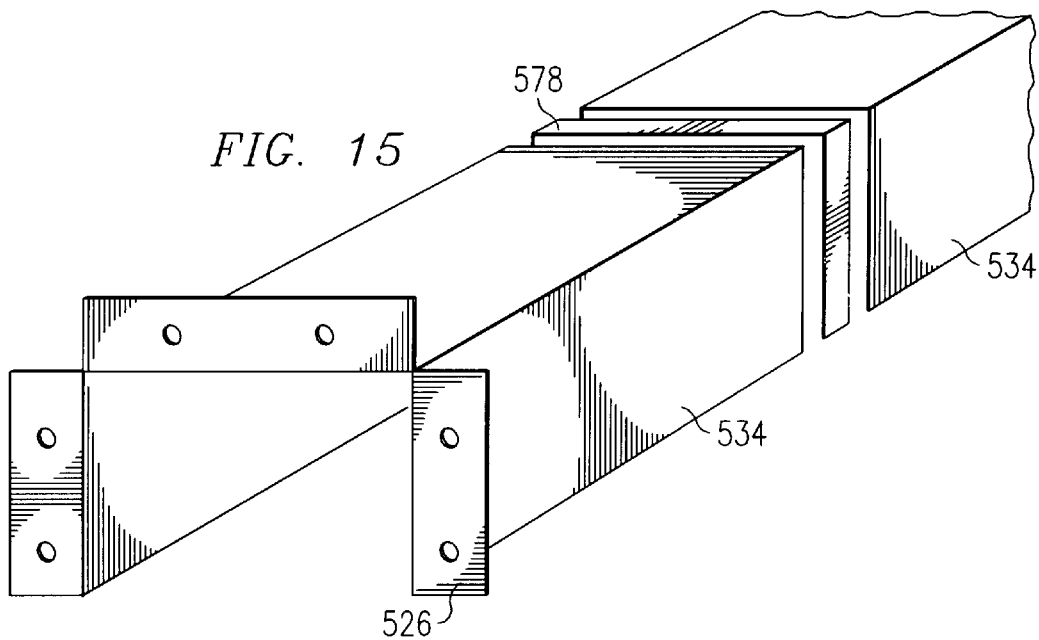

FIG. 15 shows that covering means profiles 534 can also be coherent in one piece with covering means joining elements 526. Production by extrusion as piece goods or bar goods is not possible in this case. However, the covering means profiles 534 can be injection moulded to such a length that any length occurring between two guide carriages can be bridged by assembling two covering profile portions 534, wherein the connection can again be produced by any coupling means 578 which can simultaneously have a stabilising and/or sealing effect.

It has been assumed in all embodiments described hitherto that—as shown in FIG. 7—the covering means 20 is located substantially within the contour of the guide carriages 12. This is a preferred embodiment. As shown in broken lines in FIG. 1, however, this does not preclude a covering means profile 634 being placed round the guide carriages. This covering means profile 634 can then rest in the peripheral faces 680 of the respective guide carriage parallel to the axis X and, in turn, can make sealing contact with the guide rail 10 by means of sealing flanges 682. In this way, it is even possible, with three and more guide carriages 12 on a guide rail 10, to cover the respectively exposed rail portions between successive guide carriages.

For terminological completeness, it is also pointed out that the covering means profile 34 forms a profile cavity 11 with the guide rail 10 in FIG. 8a.

When using an embodiment of a covering means profile 334 according to FIG. 12, covering caps must obviously be provided at the ends of the chambers 372 to prevent lubricant from escaping.

If stabilising elements are provided to prevent a covering means profile from bulging, the axial securing thereof can be achieved by tips which dig into the respective covering means profile.

In the German description, the terms "extrusion" and "Strangguô" are interchangeable.

The covering means profile can also be produced in the final profile shape, for example U-shape, as shown in FIG. 11.

A lubricating nipple 483 can also be provided on the covering means joining element 426 and/or the covering means profile 434 for the regular replenishment of lubricating oil or lubricating grease as shown in FIG. 14.

The characterisation of the covering means as "rigid" should obviously be interpreted according to the respective material and purpose. In particular, the term "rigid" is to denote a differentiation over long distances from bellows-type covering means. In this respect, "rigid" can also be interpreted in the sense of "substantially fold-free". The transfer of pressing forces through the covering means profile is not generally intended.

In FIGS. 16, 17, 18, 19, 20, 21, 22, 24, 25, similar parts are designated with the same reference numerals as in FIGS. 1 to 9, increased by the number 600 in each case.

Figure 16:
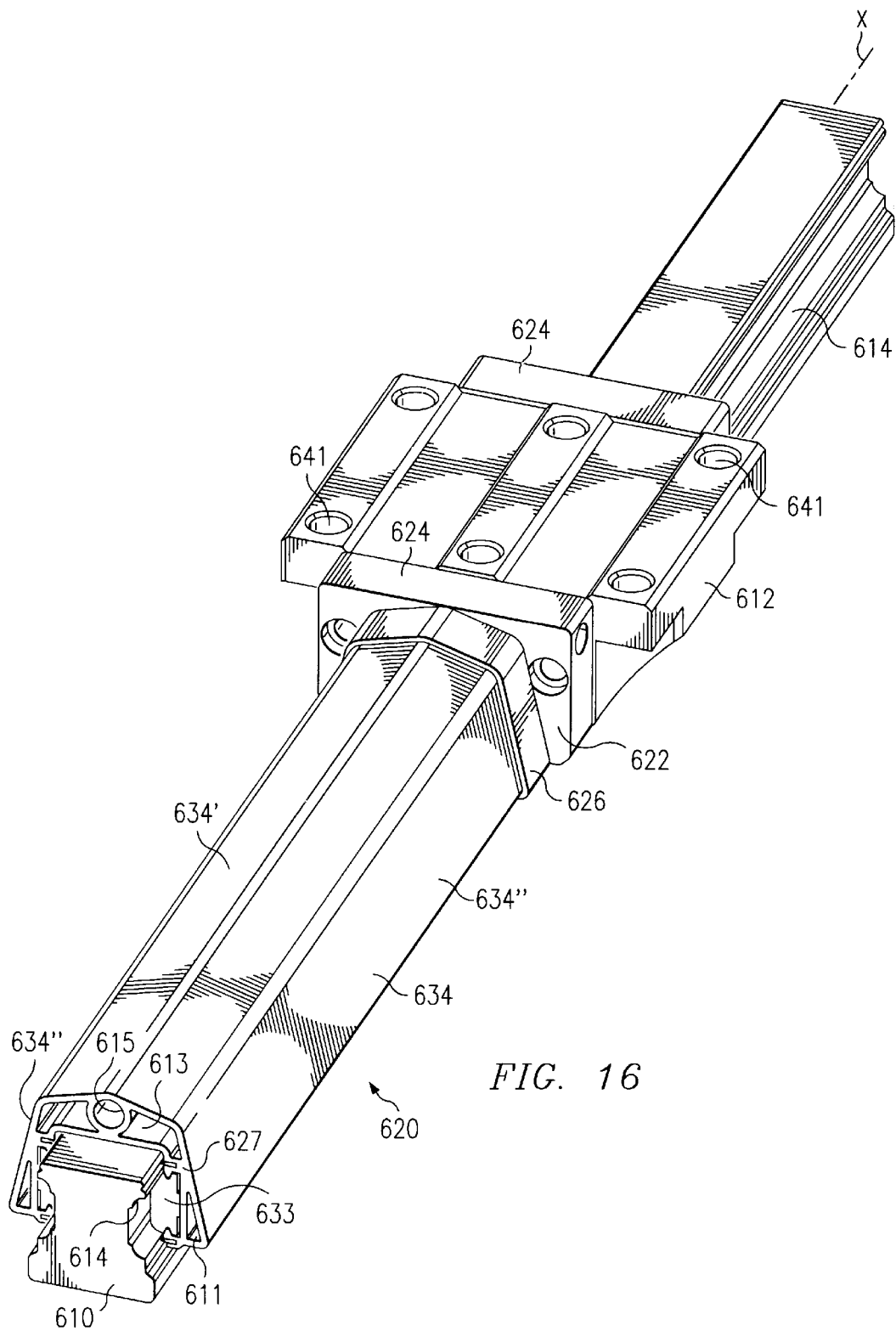
FIG. 16 shows an embodiment in which a covering means is guided directly on a guide rail and abuts against the end part of a guide carriage without a pull connection and without prevention of transverse shifting.

It can be seen in FIG. 16 that the covering means 620 is formed by a covering means profile 634 and covering profile end pieces 626 which rest on the headpieces 624 of the guide carriages 612. FIG. 16 also shows that the covering means profile 634 is designed as a hollow wall profile with a central region 634' and two lateral regions 634". The hollow wall profile consists of aluminium and is produced by extrusion. Hollow chambers 611, 613 and a lubricant duct 615 are formed in the hollow wall profile 634 due to the production process. The covering means profile 634, also called hollow wall profile, is plugged into the covering profile end piece 626, in turn resting on the headpiece 624 of the guide carriage 612.

Figure 17:
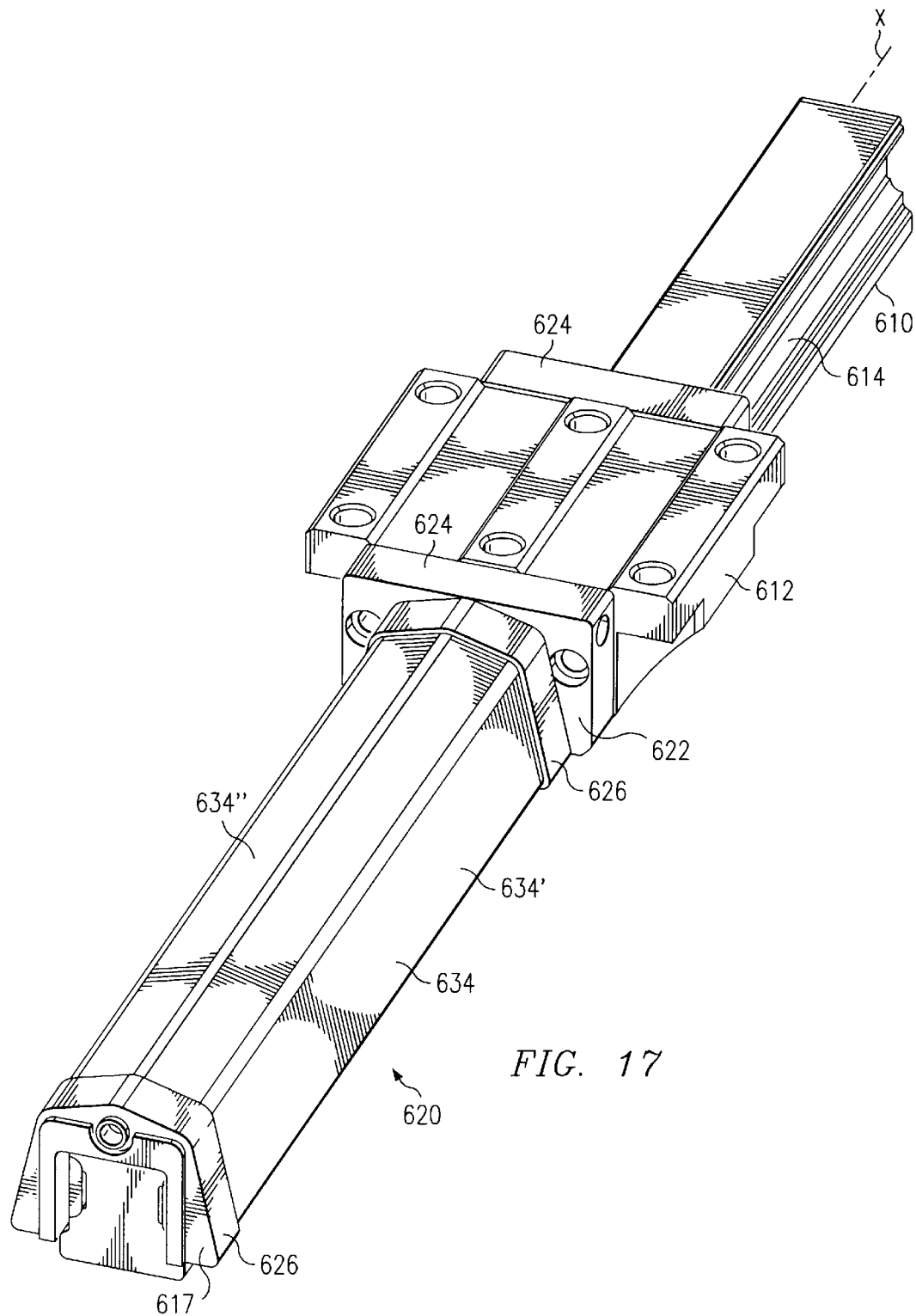
FIG. 17 shows an embodiment corresponding to FIG. 16, in which a covering means end piece can be seen at the lower end of the covering means.

As shown in FIG. 17, the covering means profile 634 engages with both its ends in a respective covering profile end piece 626 resting on a respective guide carriage 612. The lower guide carriage is not shown in FIG. 17. The two guide carriages 612 are connected to a table top, as shown in FIG. 4 and designated by 18 therein. The spacing between the two guide carriages 612 is fixed in the longitudinal direction X by the connection of the two guide carriages 612 of a common guide rail 610 to the table top 18. The covering means 620 consisting of the covering means profile 634 and the two covering profile end pieces 626 has a total length corresponding to the spacing between two successive guide carriages 612.

Figure 20:
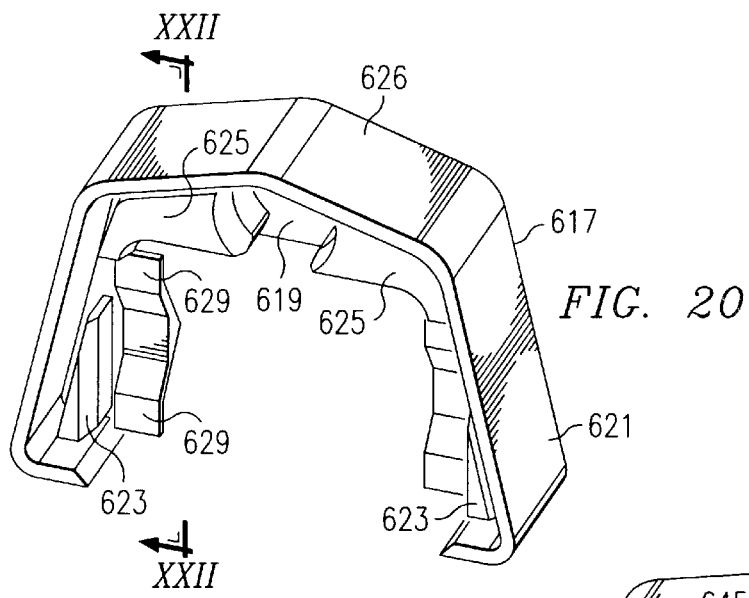
FIG. 20 shows a covering means end piece with its side facing a covering means profile.
Figure 21:
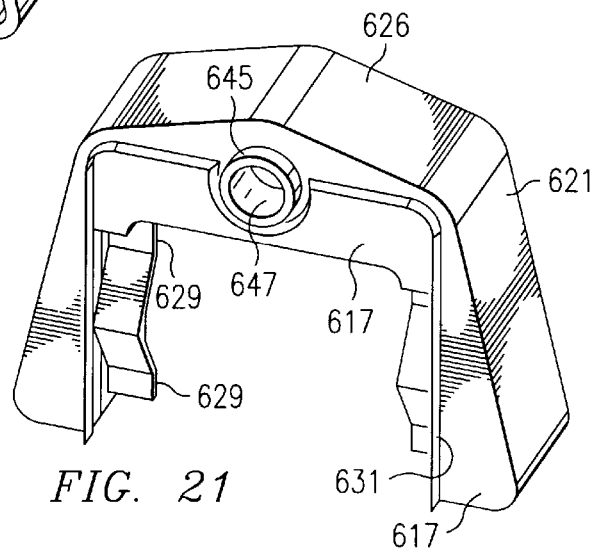
FIG. 21 shows the covering means end piece from FIG. 20 with its side facing a guide carriage.
Figure 22:
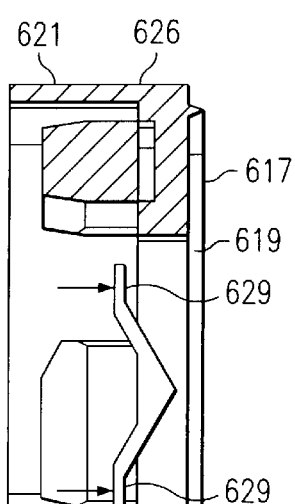
FIG. 22 shows a section along line XXII—XXII in FIG. 20.

FIGS. 20, 21 and 22 show the design of a covering profile end piece 626 in detail. The covering profile end piece 626 comprises a contact face 617 for contact with the end face 622 of the headpiece 624 according to FIGS. 16 and 17. The contact face 617 is formed by a base plate 619. A casing part 621 is produced in one piece with the base plate 619 and rests on the external peripheral face of the covering means profile 634 when the covering profile end piece 626 is plugged together with the covering means profile 634 according to FIG. 16 and 17. The base plate 619 is provided with wedge-shaped projections 623 which enter the hollow chambers 611 when the covering profile end piece 626 and the covering means profile 634 are plugged together. The base plate 619 is also provided with projections 625 which penetrate into the hollow chambers 613 when the covering profile end pieces 626 and the covering means profiles 634 are plugged together. The walls of the lubricant duct 615 come to rest between two projections 625 and abut against the base plate 619 when the covering means profile 634 and a covering profile end piece 626 are plugged together. When the covering means profile 634 and the covering profile end piece 626 are plugged together, the end faces 627, orthogonal to the axis X, of the covering means profile 634 abut against leaf spring elements 629 produced integrally with the covering profile end piece 626. A sealing strip 631 which rests against the end face 622 of the headpiece 624 in a sealing manner when the covering means 620 is fitted between two successive guide carriages 612 is injection moulded or stuck to the contact face 617 of the covering profile end piece 626. Owing to the leaf springs 629, the covering means 620 consisting of the covering means profile 634 and the covering profile end pieces 626 can be compressed axially against spring force so that the length of the covering means 620 can be adapted to the respective spacing between two successive guide carriages within limits corresponding to the normal tolerance.

Figure 19:
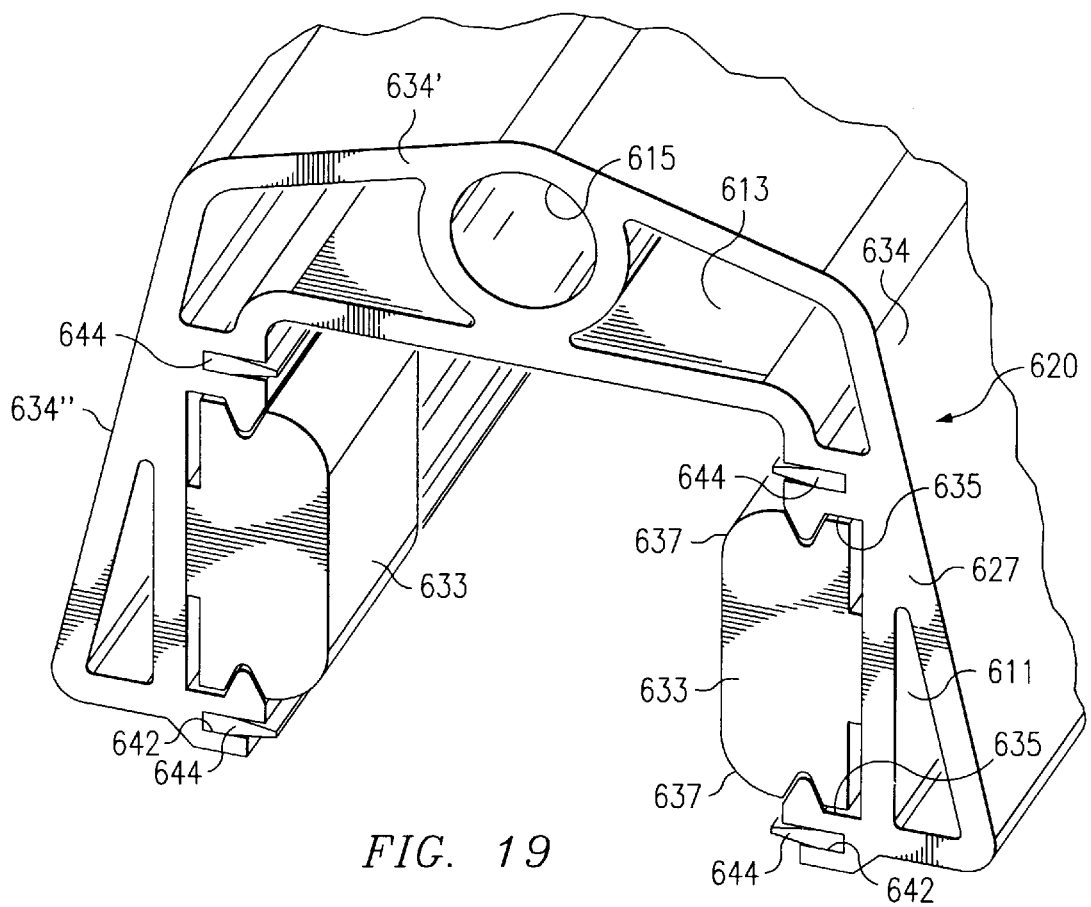
FIG. 19 shows, on an enlarged scale, the end of a covering means profile with a sliding block for the case of a guide rail with ball tracks.

A sliding block 633 is secured on the interior of the covering means 620 by a sliding block holding profile 635, as shown, in particular, in FIG. 19. The sliding block 633 is shaped in such a way that it rests slidably with its rounded regions 637 on the tracks 614 of the guide rail 610. The guide tracks 614 are designed for the contact of the balls 16 according to FIG. 2. The covering means 620 consisting of the covering profile 634 and the covering profile end pieces 626 is consequently guided on the guide rail 610 independently of the two guide carriages 612. Furthermore, for transporting the covering means 620 with the guide carriages 612, it is sufficient simply to fix the covering means 620 between the end faces 622 of the two guide carriages 612. This can be effected, for example, by pushing a first guide carriage 612, then the covering means profile 634 with its two covering profile end pieces 626 and then a second guide carriage 612 onto the guide rail 610 in succession, then by fastening the first guide carriage 612 on the table top 618 according to FIG. 4 with screws, then bringing the second guide carriage toward the first guide carriage until the screw holes 641 of the second guide carriage are aligned with corresponding holes in the table 18 with axial compression of the covering means 620 consisting of the covering means profile 634 and the covering profile end pieces 626 and finally by also screwing the second guide carriage 612 to the table top 18.

Figure 18:
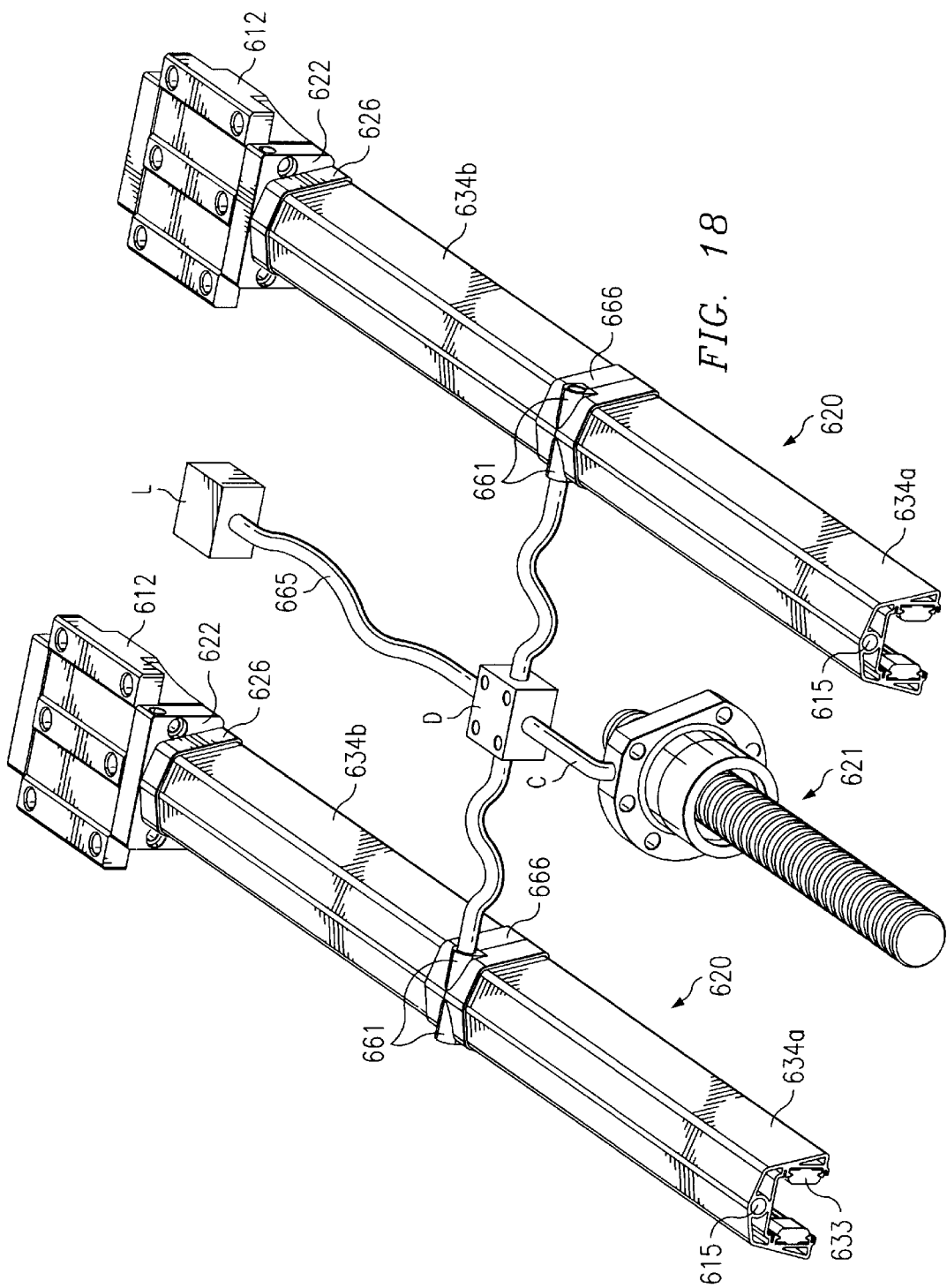
FIG. 18 shows a guide unit consisting of two modules according to FIG. 16 in conjunction with a linear drive and a supply of lubricant.
Figure 24:
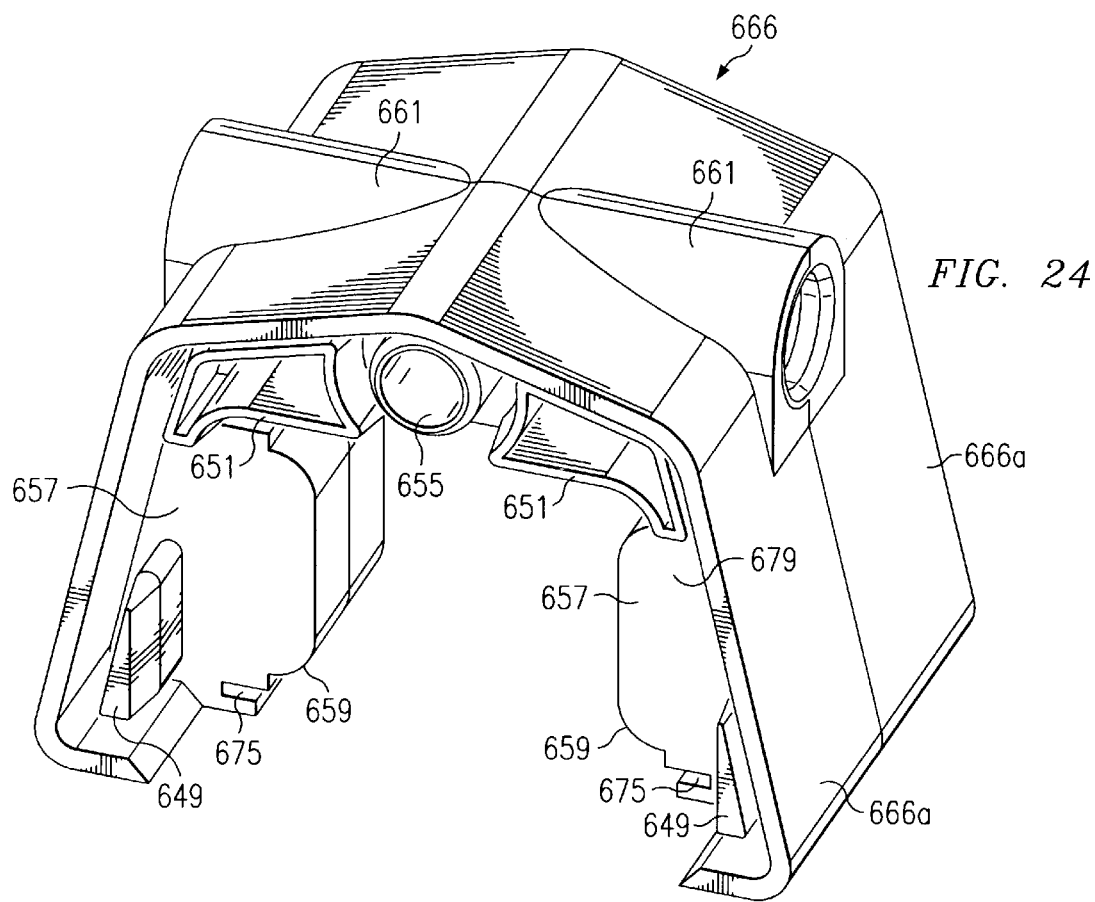
FIG. 24 shows a coupling piece for the connection of two succeeding covering profile portions.

The sealing strip 631 then rests displaceably on the end face 622 of the headpiece 624 in a transverse plane orthogonal to the longitudinal axis X and can be adjusted relative to the end face 622 itself into the correct position defined by the position of the guide carriage 612 and the guidance of the covering means profile 634 by means of the sliding blocks 633 on the guide rail 610. A sealing collar 645 which rests tightly against the end face 622, more specifically in the environment of a lubricant connecting surface in the end face 622 of the headpiece 624 is moulded on the contact face 617 for sealing a lubricant passage 647 of the base plate 619 from the end face 622 of the headpiece 624. However, it is also conceivable for the sealing collar 645 to be immersed into the lubricant connecting orifice of the headpiece 624 if this sealing collar 645 is elastically deformable. FIG. 18 shows that a respective pair of two guide carriages 612, that is a total of four guide carriages 612, which are all screwed to a common table top corresponding to the table top 18 in FIG. 4 is guided on two guide rails extending in parallel (the guide rails themselves are not shown). In this case, the covering means 620 of the two guide rails are assembled from two respective covering profile portions 634a and 634b, two covering profile end pieces 626 and a coupling piece 666. The construction of a coupling piece 666 is shown in FIG. 24. The coupling piece 666 is assembled from two coupling piece halves 666a. The two coupling piece halves are identical in shape. Each coupling piece half 666a is constructed with projections 649 and 651 for engagement in the hollow chambers 611 and 613 of the respective covering means profile 634a and 634b. A length of pipe 655 is also provided on each of the halves 666a of the coupling piece for engagement in the lubricant duct 615 according to FIGS. 16 and 19.

Sliding blocks 657 are also shaped on the coupling piece 666 in FIG. 24, for example by injection moulding and casting. These sliding blocks 657 rest with their rounded regions 659 on the tracks 614 (FIG. 16) of the guide rail 610, so the covering 620 is also guided on the guide rail 614 in the region of the coupling piece 666. It will be appreciated that the sliding blocks 657 on the coupling piece 666 can be dispensed with if it is decided also to provide a sliding piece 633 within the respective covering profile portions 634a or/and 634b in the vicinity of the coupling piece 666 according to FIGS. 16 and 19.

According to FIGS. 18 and 24, the coupling pieces 666 are each provided with two lubricant supply connections 661 which can be used as desired and are connected via a lubricant distributing block D according to FIG. 18 and a line 665 to a stationary lubricant supply system L shown as a black box. It will be appreciated that the lubricant supply connection 661 not connected in each case can be sealed by a sealing element or a nonreturn valve. A further line C leads from the lubricant distributing block D to a linear drive 671 formed by a spindle and a ball nut.

Figure 25:
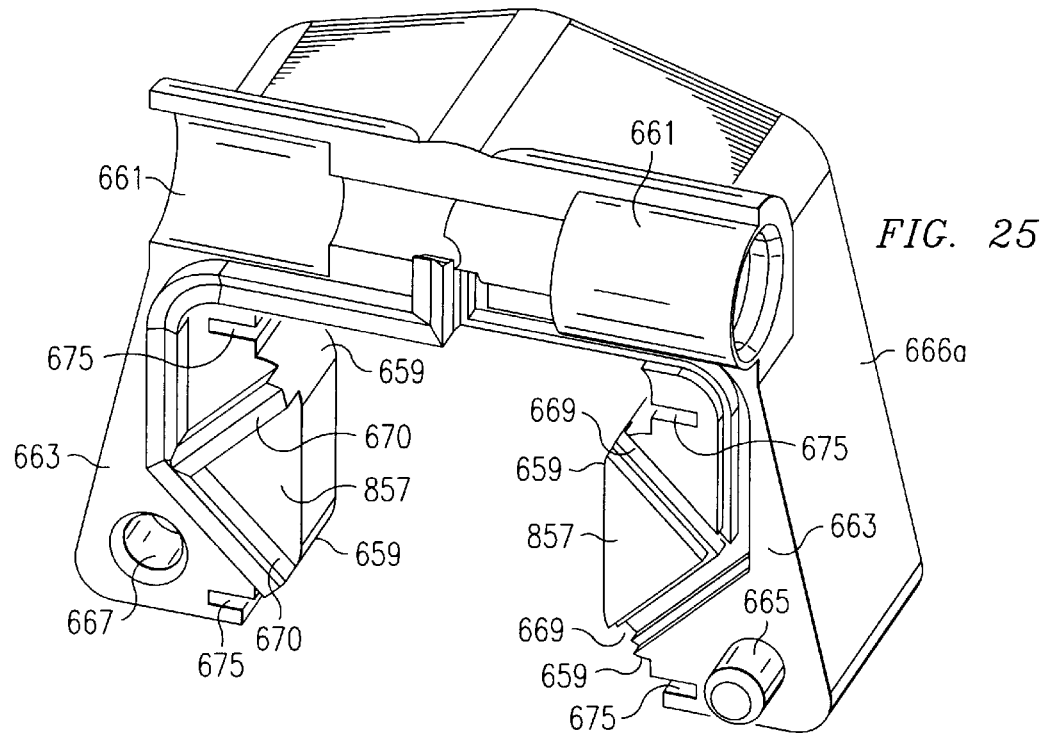
FIG. 25 shows a component for forming a coupling piece according to FIG. 24.

FIG. 25 again shows the lubricant supply connections 661 on one half 666a of the coupling piece. Two halves 666a of a coupling piece, as shown in FIG. 25, can be assembled to form a coupling piece 666, respective connecting faces 663 coming into contact with one another and the connection being produced by a combination of a plug-in bolt 665 and a plug-in hole 667 or by adhesion or by welding. The connecting faces 663 contain duct formations 669 and 670 which are complementary with one another and, after assembly of two coupling piece halves 666a, form connecting ducts 669 to 670 from the lubricant supply connections 661 to the rounded regions 659 and therefore open to the tracks 614 of the guide rail 610. The lubricant issuing from these connecting ducts 669 to 670 therefore passes onto the tracks 614 on which the balls 16 according to FIG. 2 roll and the sliding blocks 633 according to FIG. 16 and sliding blocks 657 according to FIG. 24 slide simultaneously.

FIG. 19 shows that the covering means profiles 634 have sealing strips 644 which are held by seal receiving chambers 642 of the respective covering means profile 634 and rest tightly on the guide rail above and below the two tracks 614 on one side of a guide rail 610. As shown in FIGS. 24 and 25, the sealing strips 644 are continued in the region of the coupling pieces 666, for which purpose seal receiving chambers 675 are also provided in the coupling pieces 666.

Figure 23:
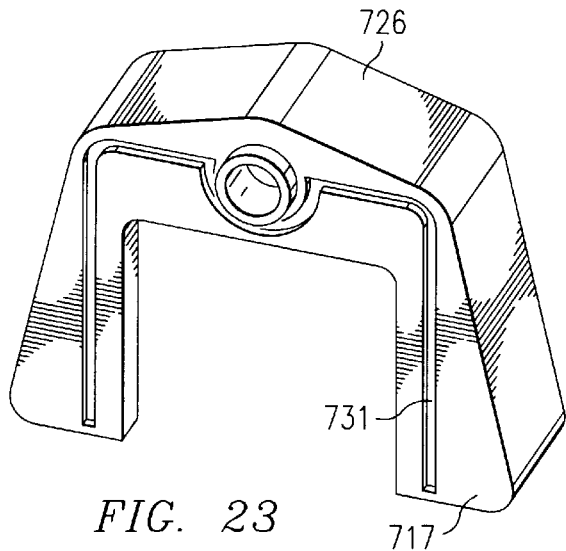
FIG. 23 shows a modified embodiment of a covering means end piece with its side facing a guide carriage.
Figure 26:
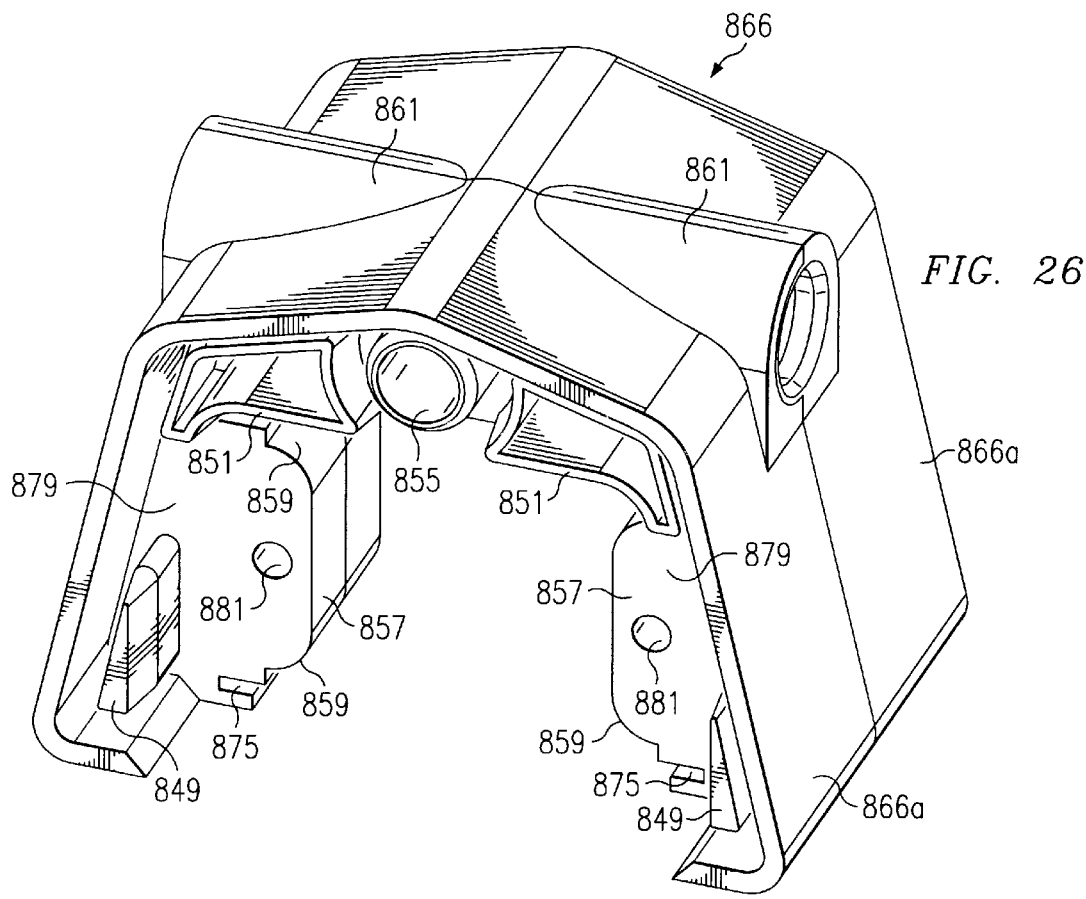
FIG. 26 shows a further embodiment of a coupling piece.
Figure 27:
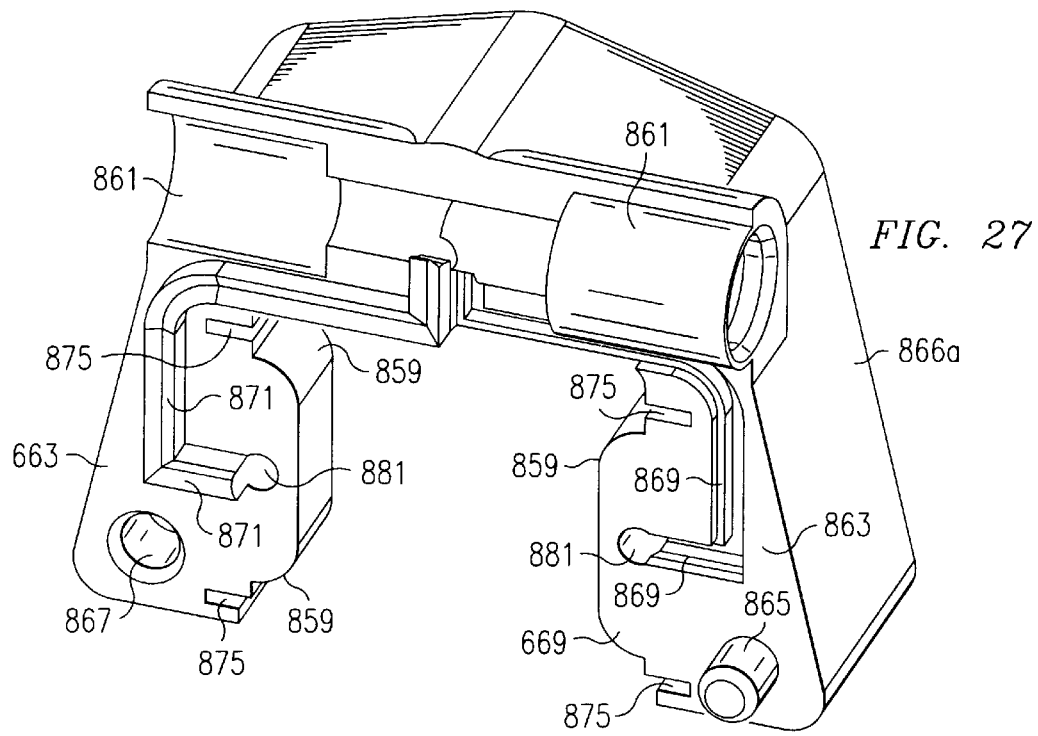
FIG. 27 shows a component for forming the coupling piece according to FIG. 26.

FIG. 23 shows an alternative covering profile end piece 726. For sealing the covering profile end piece 726 from an end face 622 according to FIG. 16, a groove 731 into which a sealing cord can be inserted is made in the contact face 717. FIGS. 26 and 27 show a further coupling piece 866, again assembled from two identical coupling piece halves 866a. Similar parts are provided with the same reference numerals as in FIGS. 24 and 25, but with a first number 8 rather than 6 in each case. Duct formations 869, 871 for forming connecting ducts 869 to 871, which pass into lubricant outlet orifices 881 are also formed in the connecting faces 863 in the embodiment according to FIGS. 26 and 27. The lubricant outlet orifices 881 end in end faces 879 of the sliding blocks 857. It can readily be imagined that the coupling piece 866 according to FIG. 26 is assembled with two covering means profiles again corresponding to positions 634a, 634b in FIG. 18 and that a respective lubricant distributor with a shape corresponding to the sliding block 663 according to FIG. 19 is inserted in each of these covering means profiles. However, this lubricant distributor consists of a material which is not intended primarily for guiding the covering means profile on the guide rail but for storing and delivering lubricant to the tracks. For example, the lubricant distributor can be a porous foam rubber or foam plastic which is impregnated with lubricant. This lubricant distributor then rests by one end on the end face 879 of the sliding block 857 integrated in the coupling piece 866, more specifically in congruence with the lubricant outlet orifice 881, so that the lubricant coming through the lubricant outlet orifice 881 enters directly into the lubricant distributor, distributes itself therein and is delivered to the tracks 614 according to FIG. 16. The assembly of the halves 866a of the coupling pieces according to FIG. 27 to form the coupling piece 866 according to FIG. 26 is effected similarly to the assembly of the coupling piece according to FIGS. 24 and 25.

Figure 30:
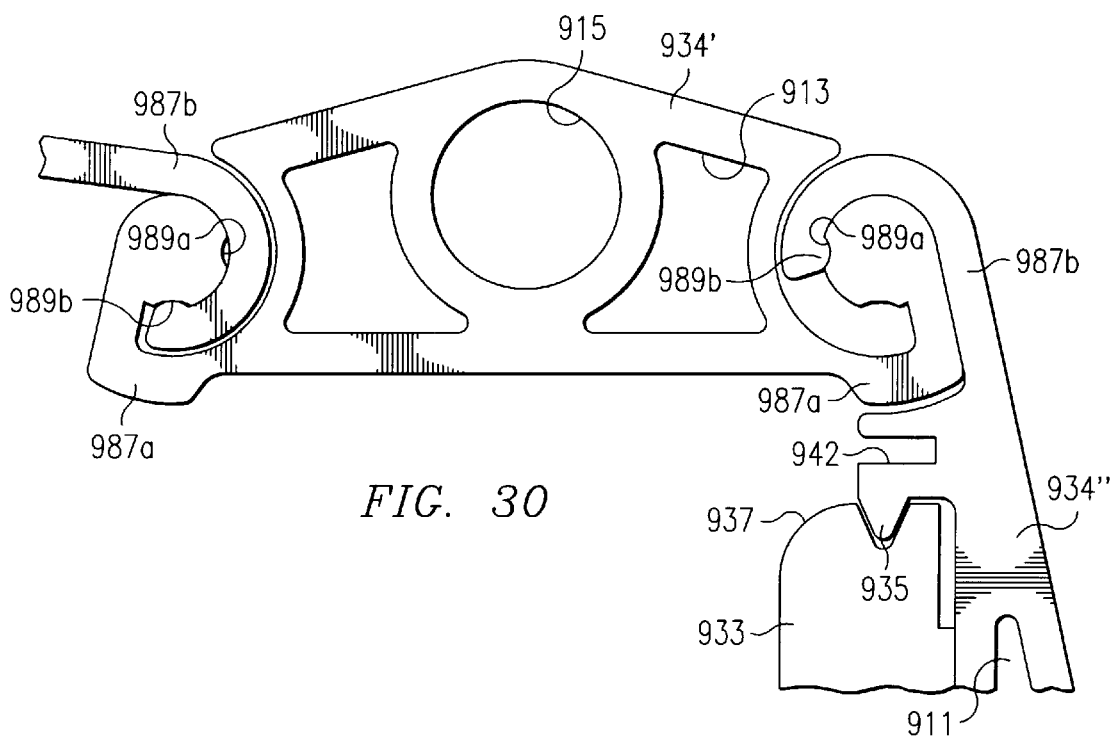
FIG. 30 shows a further method of assembling several profile wall parts following one another in the circumferential direction round the guide rail.

According to FIGS. 28 to 30, a covering means 920 is again designed as a covering means profile 934 with a similar hollow profile shape of the profile walls 934' and 934", as shown in FIG. 19. The covering means profile 934 consists here of a central part 934' and two lateral parts 934" which are articulated to one another by hinge-like joints 985, more specifically in such a way that they can be pivoted relative to one another round pivot axes P according to FIG. 28. The hinge-like joints 985 are formed by complementary hook formations 987a on the central part 934' and 987b of the profile on the lateral parts 934" of the profile and can be pushed axially into one another for engagement, as shown by the arrow S in FIG. 29. Further details are shown in FIG. 30, where similar parts are provided with the same reference numerals as in the above-described embodiments, but with a first numeral 9 in each case. FIGS. 28 and 29 against show hook formations 987a and 987b which are already hooked in one another. A nose 989b for engagement in a trough 989a on the hook formation 987a is also shown on the hook formation 987b. By means of this combination of a nose 989b and a trough 989a, the two profile wall parts 934' and 934" can be fixed relative to one another in the position shown in FIG. 30, more specifically in the right-hand half thereof, after being pushed or hooked into one another and then being pivoted.

Figure 31:
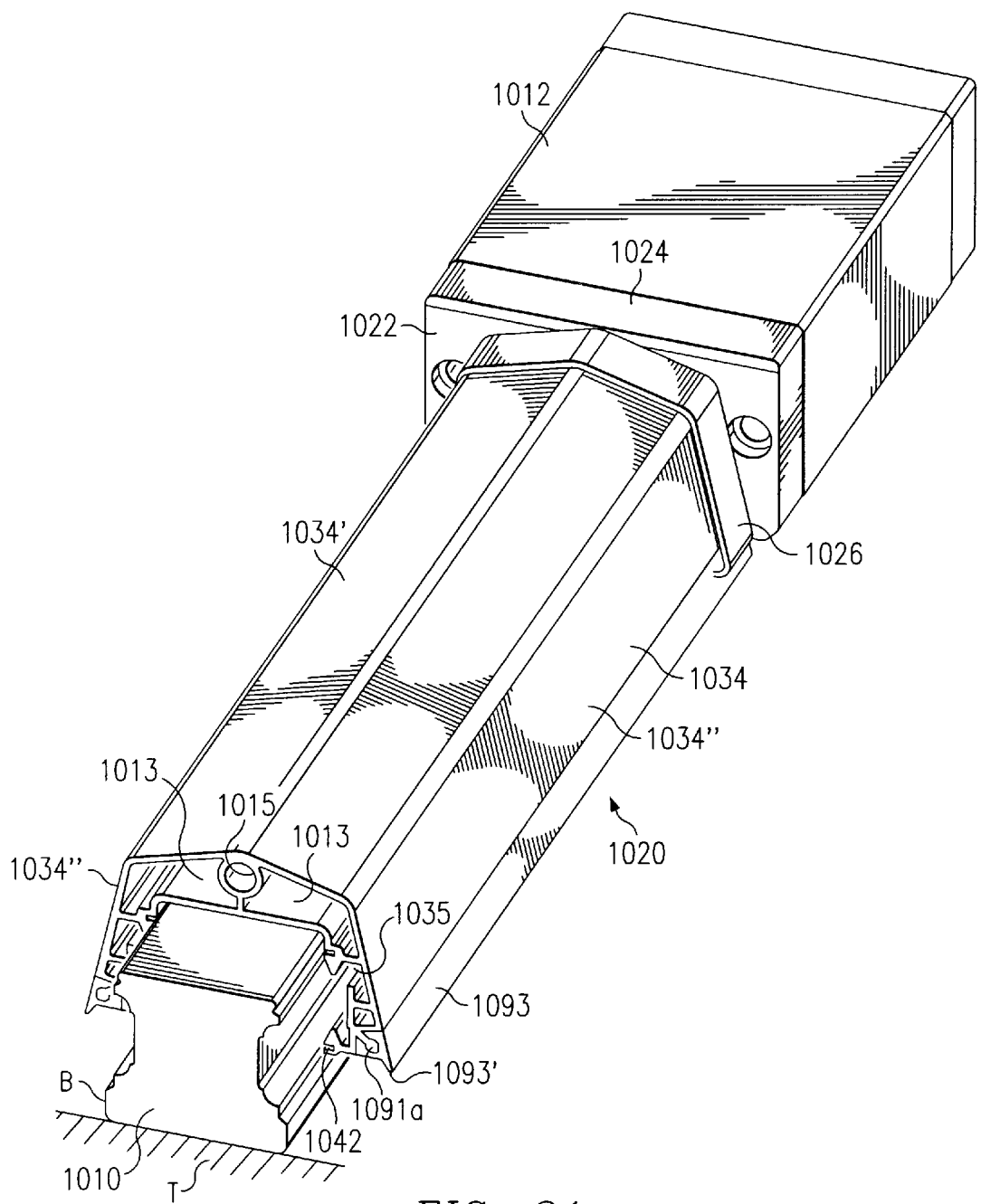
FIG. 31 shows a covering means for covering a guide rail supplemented by covering means supplements in the region of the foot part of the guide rail.
Figure 32:
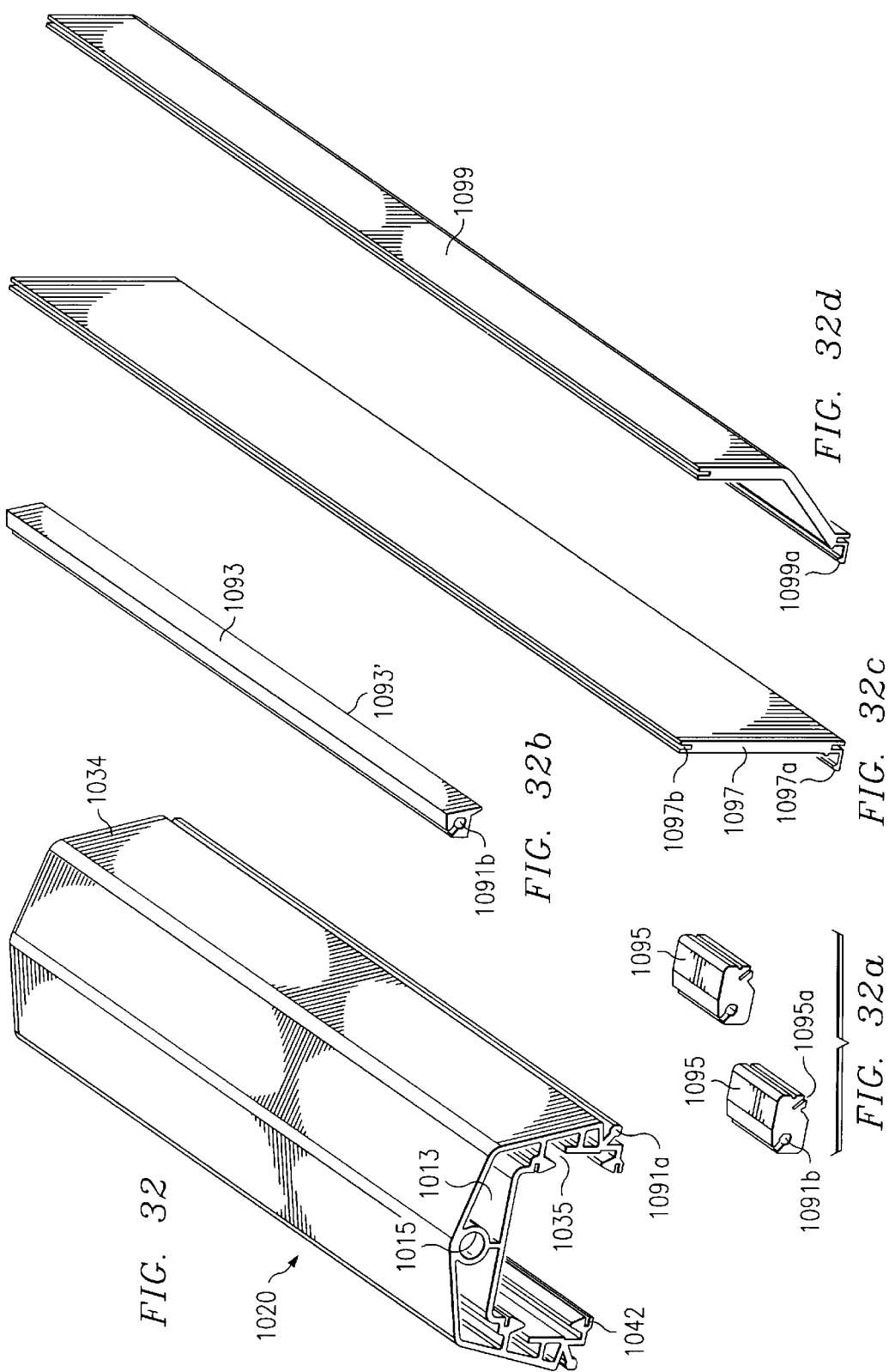
FIG. 32 shows a covering means profile with a supplement holding profile for the joining of a covering supplement.

FIG. 31 shows a single-piece covering means profile 1034 which is similar in construction to the covering means profile 634 according to FIG. 19. Similar parts are provided with the same reference numerals as in the earlier embodiments but with the respective prefix 10. A particular feature is that holding profiles 1091a onto which cover-supplementing strips 1093 can be pushed or snapped are shaped on the lateral parts 1034". These cover-supplementing strips 1093 cover the formerly exposed foot part of the guide rail 1010. A sealing lip 1093' which is able to rest on a carrier T of the guide rail as a sliding seal can be formed on the cover-supplementing strip 1093. According to FIG. 32b, the cover-supplementing strip 1093 has a complementary profile 1091b which is complementary to the holding profile 1091a on the covering means profile 1034 (see FIGS. 32 and 32b).

The supplementing profile strip 1093 can be provided, omitted or removed, as desired.

FIGS. 32a and 32c show that adapters 1095 can also be fastened on the covering means profile 1034 by means of the holding profile 1091a by pushing or snapping on, and supplementing walls 1097 or 1099 can then be fastened on the adapters 1095 by pushing or snapping on, more specifically by means of complementary profile grooves 1095a or 1097a or 1099a. An even more extensive enclosure can then be achieved in this way according to FIG. 33. With an arrangement according to FIG. 4, the supplementing walls 1097 can extend with a table 18 up to the underside of the table and, if desired, can rest with seals on the underside of the table. Longitudinal slots 1097b are shaped on the upper edges of the supplementing walls 1097 for receiving these seals.

Figure 33:
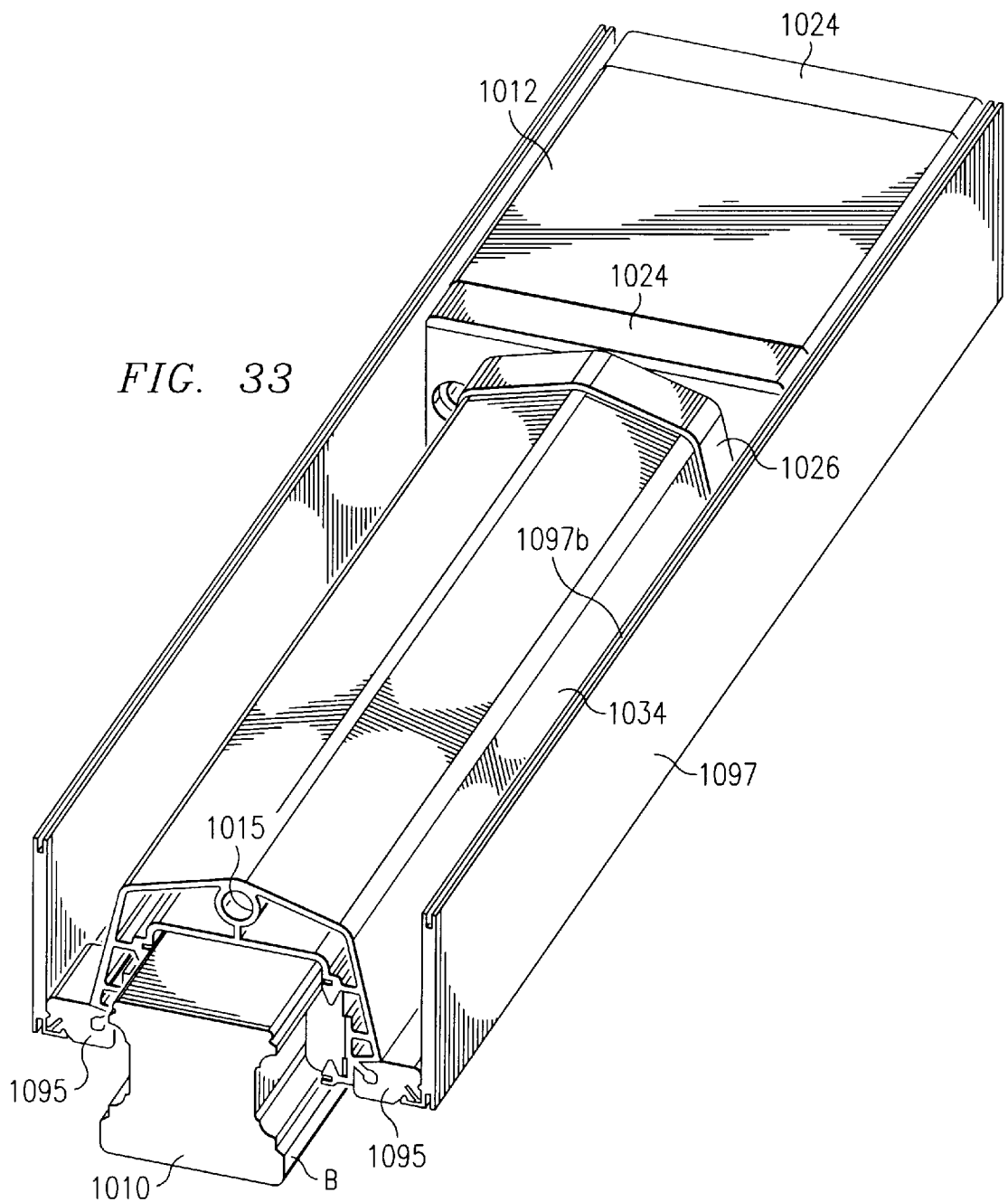
FIG. 33 shows a guide unit with lateral covering of a guide carriage.
Figure 34:
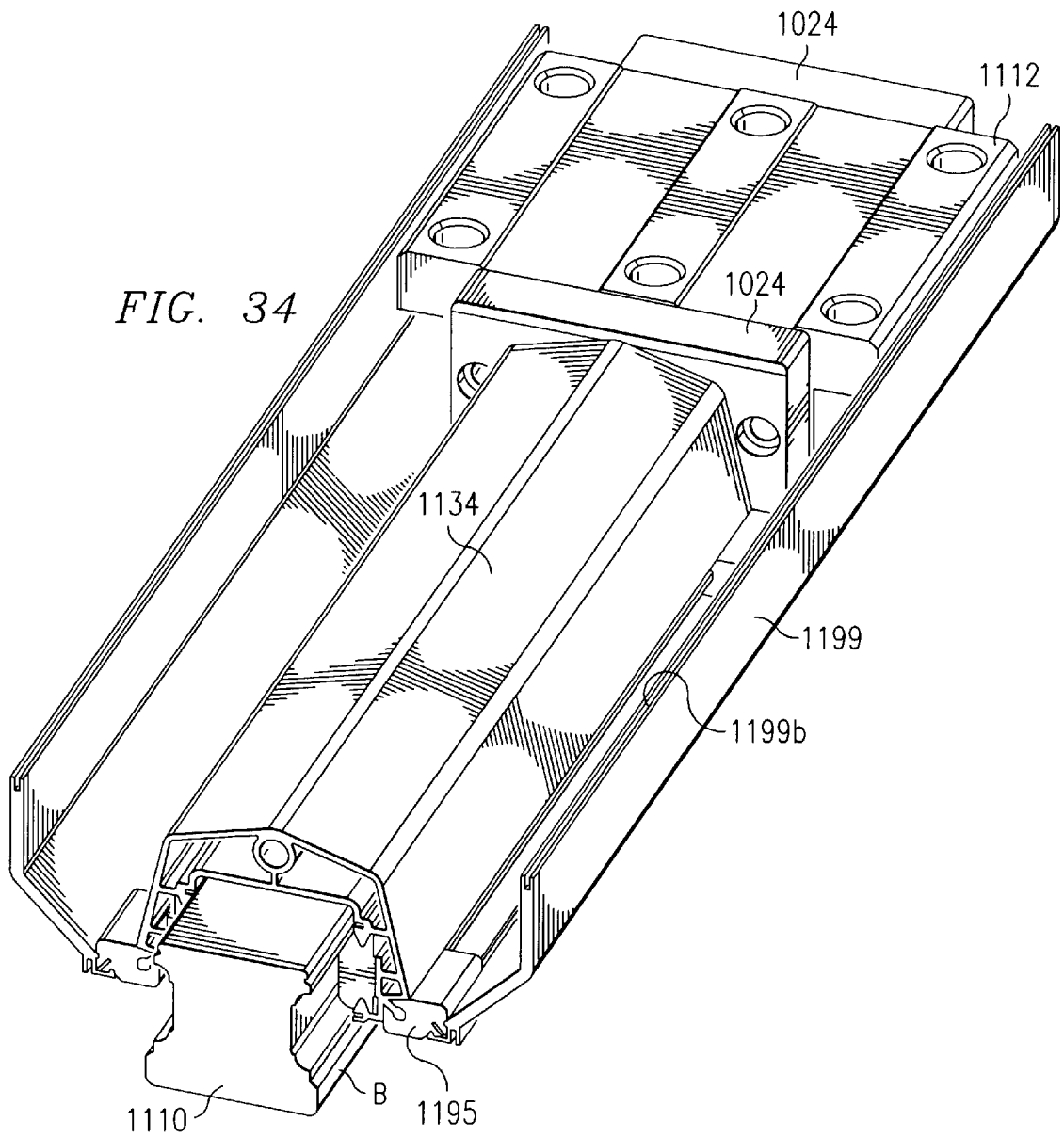
FIG. 34 shows a guide unit with widened guide carriage and lateral covering of this guide carriage.

If the guide carriage 1112 is widened according to FIG. 34, with dimensions otherwise identical to those in FIG. 33 of the guide rail 1110 and of the covering means profile 1134, lateral coverage of the guide carriage 1112 can be achieved by using kinked supplementing walls 1199, as also shown in FIG. 32d. An adapter similar to the adapter 1095 from FIG. 32a can be used for producing the connection. The kinked supplementing walls 1199 can also be raised until they make contact with a table according to FIG. 4 and can be sealed against the table. Slots 1199b into which longitudinal sealing strips can be inserted are also shaped at the top on the supplementing walls 1199.

Figure 19A:
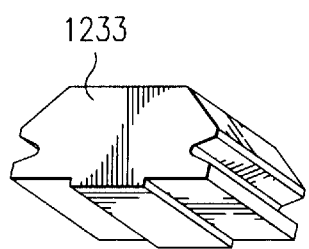
FIG. 19a shows a sliding block for the case of a guide rail with roller tracks.

According to FIG. 19a, a sliding block 1233 is constructed with sliding faces for resting on roller tracks. The sliding blocks 1233 are used instead of the sliding blocks 633 according to FIG. 16 if a guide carriage is guided on a guide rail by endless roller races instead of endless ball races and plane tracks are accordingly formed on the guide rail.

What is claimed is:

1. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail at least in a longitudinal portion of the guide rail between the two mutually facing ends of the at least two guide carriages, said covering means being in abutment with the mutually facing ends of the at least two guide carriages for making a driving connection with the at least two guide carriages for common movement therewith and having a substantially rigid configuration in the axial direction between the two mutually facing ends, at least one sliding face which makes sliding engagement with a slideway of the guide rail being provided on the covering means, said sliding face being arranged on a sliding block fastened on the covering means, the covering means, at least over a portion of its longitudinal dimension, forming a covering means profile which approximately follows the rail profile at a distance from it—when viewed in a section orthogonal to the longitudinal axis, and partial profiles of the covering means profile following one another in the circumferential direction being articulated to one another about a hinge axis parallel to the longitudinal axis.

2. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail at least in a longitudinal portion of the guide rail between the two mutually facing ends of the at least two guide carriages, said covering means being in abutment with the mutually facing ends of the at least two guide carriages for making a driving connection with the at least two guide carriages for common movement therewith and having a substantially rigid configuration in the axial direction between the two mutually facing ends, at least one sliding face which makes sliding engagement with a slideway of the guide rail being provided on the covering means, said sliding face being arranged on a sliding block fastened on the covering means, and a lubricant supply is arranged within the covering means.

3. A guide unit according to claim 2, wherein a lubricant store for long-term lubrication or service-life lubrication is arranged within the covering means.

4. A guide unit according to claim 3, wherein at least one guide carriage is constructed without a seal from the guide rail at its end facing the other respective guide carriage.

5. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail at least in a longitudinal portion of the guide rail between the two mutually facing ends of the at least two guide carriages, said covering means being in abutment with the mutually facing ends of the at least two guide carriages for making a driving connection with the at least two guide carriages for common movement therewith and having a substantially rigid configuration in the axial direction between the two mutually facing ends, at least one sliding face which makes sliding engagement with a slideway of the guide rail being provided on the covering means, said sliding face being arranged on a sliding block fastened on the covering means, the covering means comprising at least one covering means profile and at least one plug-on part, said at least one plug-on part being adapted to be plugged onto the covering means profile.

6. A guide unit according to claim 5, wherein the covering means profile is designed as a hollow wall profile having at least one hollow profile chamber and at least one plug-in projection is arranged on the plug-on part for plugging into said hollow profile chamber of the hollow wall profile.

7. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail at least in a longitudinal portion of the guide rail between the two mutually facing ends of the at least two guide carriages, said covering means being in abutment with the mutually facing ends of the at least two guide carriages for making a driving connection with the at least two guide carriages for common movement therewith and having a substantially rigid configuration in the axial direction between the two mutually facing ends, at least one sliding face which makes sliding engagement with a slideway of the guide rail being provided on the covering means, said sliding face being arranged on a sliding block fastened on the covering means, the sliding block being designed as a lubricator for lubriating a track or/and a slideway.

8. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail at least in a longitudinal portion of the guide rail between the two mutually facing ends of the at least two guide carriages, said covering means being in abutment with the mutually facing ends of the at least two guide carriages for making a driving connection with the at least two guide carriages for common movement therewith and having a substantially rigid configuration in the axial direction between the two mutually facing ends, at least one sliding face which makes sliding engagement with a slideway of the guide rail being provided on the covering means, said sliding face being arranged on a sliding block fastened on the covering means, a lubricant duct extending in the longitudinal direction of the guide rail being provided in the covering means.

9. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail at least in a longitudinal portion of the guide rail between the two mutually facing ends of the at least two guide carriages, said covering means being in abutment with the mutually facing ends of the at least two guide carriages for making a driving connection with the at least two guide carriages for common movement therewith and having a substantially rigid configuration in the axial direction between the two mutually facing ends, at least one sliding face which makes sliding engagement with a slideway of the guide rail being provided on the covering means, said sliding face being arranged on a sliding block fastened on the covering means, the covering means comprising a hollow wall profile, and a lubricant duct being integrated into the hollow wall profile.

10. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail between the two mutually facing ends of the at least two guide carriages, said covering means making a driving connection with the at least two guide carriages for common movement therewith and having a substantially rigid configuration in the axial direction between the two mutually facing ends at least over a portion of its longitudinal dimension, at least one sliding face which makes sliding engagement with a slideway of the guide rail being provided on the covering means, the sliding face being arranged on a sliding block fastened on the covering means, and holding profile means for receiving the sliding block being provided for fastening the sliding block on a covering means profile of the covering means.

11. A guide unit comprising at least one guide rail, said guide rail having a longitudinal axis and a rail profile with at least one track, also comprising at least two guide carriages guided on the at least one track of the guide rail with mutually facing ends, and a covering means for covering the guide rail at least in a longitudinal portion of the guide rail between the two mutually facing ends of the at least two guide carriages, said covering means making a driving connection with the at least two guide carriages for common movement therewith and having a substantially rigid configuration in the axial direction between the two mutually facing ends at least over a portion of its longitudinal dimension, the covering means comprising a covering means profile with a plurality of profile wall parts which adjoin one another in the circumferential direction about the longitudinal axis and are articulated to one another.

12. A guide unit according to claim 11, wherein profile wall parts adjacent to one another in the circumferential direction are constructed with hinge parts to allow the profile wall parts to pivot relative to one another about a hinge axis parallel to the longitudinal axis.

13. A guide unit according to claim 12, wherein the hinge parts can be pivoted relative to one another and brought into an interlocking position in which the profile wall parts define a profile cross-sectional shape suitable for covering the guide rail.

14. A guide unit according to claim 12, wherein the hinge parts can be connected detachably to one another by being pushed together axially or by hooking.

\* \* \* \* \*